United States Patent
Lin et al.

(10) Patent No.: US 10,244,346 B2
(45) Date of Patent: Mar. 26, 2019

(54) DETERMINING A POSITION OF A WIRELESS DEVICE IN A CELLULAR NETWORK

(71) Applicant: Telefonaktiebolaget LM Ericsson (publ), Stockholm (SE)

(72) Inventors: Xingqin Lin, San Jose, CA (US); Olof Liberg, Stockholm (SE); Sara Modarres Razavi, Linköping (SE); Yutao Sui, Solna (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/559,918

(22) PCT Filed: Jun. 29, 2017

(86) PCT No.: PCT/SE2017/050724
§ 371 (c)(1),
(2) Date: Sep. 20, 2017

(87) PCT Pub. No.: WO2018/030935
PCT Pub. Date: Feb. 15, 2018

(65) Prior Publication Data
US 2018/0242101 A1 Aug. 23, 2018

Related U.S. Application Data

(60) Provisional application No. 62/374,651, filed on Aug. 12, 2016.

(51) Int. Cl.
*H04W 24/00* (2009.01)
*H04W 4/02* (2018.01)
(Continued)

(52) U.S. Cl.
CPC .......... *H04W 4/02* (2013.01); *G01S 5/14* (2013.01); *H04L 5/0048* (2013.01); *H04W 4/20* (2013.01);
(Continued)

(58) Field of Classification Search
CPC ....... H04W 64/00; H04W 76/02; H04W 4/02; H04W 88/02; H04W 72/04; H04W 16/10;
(Continued)

(56) References Cited

U.S. PATENT DOCUMENTS 9,661,663 B1 * 5/2017 Lin .................... H04W 4/70
9,980,260 B2 * 5/2018 Li ..................... H04W 72/0413
(Continued)

FOREIGN PATENT DOCUMENTS

WO   2012154105 A1   11/2012

OTHER PUBLICATIONS

Vodafone, et al., "New work item proposal: Enhancements of NB-IoT", Document for Decision, Agenda Item: 10.1.1, 3GPP TSG RAN Meeting #72, RP-161324, Busan, Korea, Jun. 13, 2016, pp. 1-8.
(Continued)

*Primary Examiner* — Danh C Le
(74) *Attorney, Agent, or Firm* — Coats & Bennett, PLLC

(57) ABSTRACT

Systems and method of determining a position of a wireless device are presented. In one exemplary embodiment, a method is performed by a network node (201, 207, 300, 400, 500, 700, 800, 900) for determining a position of a wireless device (209) in a wireless communication system (200). Further, the method may include determining (601) a set (221) of one or more radio resources on which positioning measurements are to be performed by a group (210) of cells (211, 213, 215) on a device-unique reference signal (217) transmitted by the wireless device. Further, the method may
(Continued)

include assigning (603) the set or individual radio resources in the set to the group of cells.

33 Claims, 26 Drawing Sheets

(51) Int. Cl.
| | |
|---|---|
| G01S 5/14 | (2006.01) |
| H04W 72/04 | (2009.01) |
| H04L 5/00 | (2006.01) |
| H04W 4/20 | (2018.01) |
| H04W 64/00 | (2009.01) |
| H04M 1/725 | (2006.01) |
| H04W 88/02 | (2009.01) |

(52) U.S. Cl.
CPC ......... *H04W 64/003* (2013.01); *H04W 72/04* (2013.01); *H04M 1/72519* (2013.01); *H04M 1/72522* (2013.01); *H04W 88/02* (2013.01)

(58) Field of Classification Search
CPC .............. H04L 29/08657; H04L 5/007; H04M 1/72519; H04M 1/72522
USPC ......... 455/450, 456, 5, 456.6, 550, 1, 456.1; 370/329
See application file for complete search history.

(56) References Cited

U.S. PATENT DOCUMENTS

| | | | | |
|---|---|---|---|---|
| 2012/0040696 | A1* | 2/2012 | Siomina | G01S 5/0036 455/456.6 |
| 2012/0320775 | A1* | 12/2012 | Lee | H04B 7/024 370/252 |
| 2013/0288730 | A1* | 10/2013 | Gomadam | H04W 24/00 455/509 |
| 2014/0313915 | A1* | 10/2014 | Lee | H04B 7/024 370/252 |
| 2015/0382205 | A1* | 12/2015 | Lee | H04B 7/0417 370/329 |
| 2016/0088613 | A1* | 3/2016 | Li | H04W 24/10 370/329 |
| 2017/0006492 | A1* | 1/2017 | Khoshnevisan | H04B 7/0626 |
| 2018/0049053 | A1* | 2/2018 | Kaikkonen | H04W 24/08 |

OTHER PUBLICATIONS

Lin, X., et al., "Random Access Preamble Design and Detection for 3GPP Narrowband IoT Systems," IEEE Wireless Communications Letters, vol. 5, Issue 6, Sep. 15, 2016, pp. 640-643, DOI: 10.1109/LWC.2016.2609914.

Huawei, et al., "Motivation for new WI on Enhancement of NB-IoT, Huawei, Vodafone, HiSilicon, Neul," Document for: Discussion, Agenda Item: RP-160996, 3GPP TSG RAN Meeting #72, Busan, Korea, Jun. 13, 2016, pp. 1-12.

Mediatek Inc, "Motivation of New Work Item Proposal: Enhancement of NB-IoT," Document for: Discussion, Agenda Item: 10.1.1, 3GPP TSG RAN Meeting #72, RP-161021, Busan, Korea, Jun. 13, 2016, pp. 1-9.

European Telecommunications Standards Institute, "LTE; Evolved Universal Terrestrial Radio Access Network (E-UTRAN); Stage 2 functional specification of User Equipment (UE) positioning in E-UTRAN (3GPP TS 36.305 version 9.3.0 Release 9)," ETSI TS 136 305 V9.3.0, Release 9, Technical Specification, Sophia Antipolis, France, Jul. 1, 2010, pp. 1-54.

\* cited by examiner

DETERMINING A POSITION OF A WIRELESS DEVICE IN A CELLULAR NETWORK

FIELD OF DISCLOSURE

The present disclosure relates generally to the field of communications, and in particular to determining a position of a wireless device.

BACKGROUND

The Internet of Things (IoT) is a vision of the future where everything that can benefit from a connection will be connected. Cellular technologies are being developed or evolved to play an indispensable role in the IoT world, particularly for machine-type communication (MTC). MTC is characterized by lower demands on data rates than, for example, mobile broadband, but with more stringent requirements on low cost device design, better coverage, and the ability to operate on batteries for years without charging or replacing the batteries. To meet the IoT design objectives, the 3rd Generation Partnership Project (3GPP) has standardized Narrowband IoT (NB-IoT) in 3GPP Release 13, which has a system bandwidth of 180 kHz and targets improved coverage, long battery life, low complexity communication design, and network capacity that is sufficient for supporting a massive number of devices.

Support for geolocation positioning in Long Term Evolution (LTE) was introduced in 3GPP Release 9. This enhancement enables operators to retrieve position information for location-based services and to meet regulatory emergency call positioning requirements. To further increase the market impact of NB-IoT, 3GPP Release 14 includes improved narrowband support for positioning, which is primarily driven by the need for the location-based services and emergency call positioning. This enhancement will be designed to maintain the ultra-low cost and complexity of an NB-IoT user equipment (UE) where appropriate, as well as the coverage and capacity of the NB-IoT network.

Geolocation positioning in LTE is supported by the architecture in FIG. 1, with direct interactions between a UE and a location server (e.g., Evolved Serving Mobile Location Server (E-SMLC)) is via the LTE Positioning Protocol (LPP). Moreover, there are also interactions between the location server and the evolved Node B (eNodeB) via the LPP protocol, to some extent supported by interactions between the eNodeB and the UE via the Radio Resource Control (RRC) protocol.

Various positioning techniques are considered in LTE, including Enhanced Cell ID, Assisted Global Navigation Satellite System (GNSS), Observed Time Difference of Arrival (OTDOA), Uplink Time Difference of Arrival (UTDOA). The Enhanced Cell ID technique essentially uses cell identification (ID) information to associate the UE to the serving area of a serving cell, and then uses additional information to determine a finer granularity position. The Assisted GNSS technique uses GNSS information retrieved by the UE that is derived based on assistance information provided to the UE from an E-SMLC. The OTDOA technique uses estimates by the UE of the time difference of reference signals from different localized base stations that are then sent to the E-SMLC for multilateration. The UTDOA technique, introduced in 3GPP Release 11, requests that the UE transmits a specific waveform that is then detected by multiple location measurement units (e.g., eNB) at known positions, with the measurements forwarded to an E-SMLC for multilateration.

In LTE, the basic concept of UTDOA is that a positioning server (e.g., an E-SMLC) requests the position of a UE, which then triggers the UE to transmit a reference signal received by a multitude of time-synchronized nodes in a network. For LTE, UTDOA uses the Sounding Reference Signal (SRS) as the reference signal to be transmitted by the UE and then received by the multitude of time-synchronized nodes. The reception of the transmitted reference signal at the network side is handled by a Location Measurement Unit (LMU), which is special-purpose equipment typically co-located with the eNB. Upon receiving the transmitted reference signal, each LMU can estimate a time of arrival (TOA) of the transmitted reference signal, calculate the Time Difference Of Arrival (TDOA), and forward the TDOA to the positioning server. Based on the TDOA provided by each LMU and the known position of each LMU, the positioning server can estimate the position of the UE by using multilateration techniques.

However, the UTDOA technique has drawbacks for NB-IoT. For instance, SRS signals that are used for UTDOA in an LTE network are not available for an NB-IoT network. Further, an NB-IOT network may not include LMU-type equipment due to cost limitations. In addition, there are advantages to upgrading an LTE or NB-IoT network to a new release (e.g., 3GPP Release 14) via a software update without having to add new hardware.

Accordingly, there is a need for techniques to improve determining a position of a wireless device (e.g., UE) using, for instance, UTDOA. Furthermore, other desirable features and characteristics of the present disclosure may become apparent from the subsequent detailed description and claims, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Systems and methods of determining a position of a wireless device (e.g., UE) are presented herein. According to one aspect, a method performed by a network node (e.g., location server, base station) includes determining a set of one or more radio resources on which positioning measurements are to be performed by a group of cells on a device-unique reference signal transmitted by the wireless device. Further, the method includes assigning the set or individual radio resources in the set to the group of cells.

According to another aspect, the method may include receiving the position measurements from the group of cells.

According to another aspect, the method may include determining the position of the wireless device based on the position measurements from the group of cells.

According to another aspect, the method may include transmitting, to one or more network nodes associated with the group of cells, an indication of the set or the individual radio resources in the set.

According to another aspect, the method may include determining a configuration of the reference signal to be transmitted by the wireless device. Further, the method may include sending, to the wireless device via a serving network node, an indication of the configuration of the reference signal.

According to another aspect, the wireless device may be configured to transmit the reference signal using the set of one or more radio resources at a first time. Further, the set of one or more radio resources may also be assigned to a second group of cells. Also, the wireless device may be configured to transmit the reference signal using the same set of one or more radio resources at a second time.

According to another aspect, at least one network node may be common between the first and second groups.

According to another aspect, the method may include determining which of a plurality of cells form the group of cells.

According to another aspect, the method may include determining which of a plurality of cell groups are associated with the wireless device.

According to one aspect, a network node (e.g., location server, base station) comprises a radio resource determination circuit configured to determine a set of one or more radio resources on which positioning measurements are to be performed by a group of cells on a device-unique reference signal transmitted by the wireless device. The network node also comprises a radio resource assignor circuit configured to assign the set or individual radio resources in the set to the group of cells.

According to another aspect, the network node may include a receiver configured to receive the position measurements from the group of cells.

According to another aspect, the network node may include a position determination circuit configured to determine the position of the wireless device based on the position measurements from the group of cells.

According to another aspect, the network node may include a transmitter configured to transmit, to one or more network nodes associated with the group of cells, an indication of the set or the individual radio resources in the set.

According to another aspect, the network node may include a reference signal configuration determination circuit configured to determine a configuration of the reference signal to be transmitted by the wireless device. The network node may include a transmitter configured to transmit, to the wireless device via a serving network node, an indication of the configuration of the reference signal.

According to another aspect, the network node may include a cell group determination circuit configured to determine which of a plurality of cells form the group of cells.

According to another aspect, the network node may include a cell group association circuit configured to determine which of a plurality of cell groups are associated with the wireless device.

According to one aspect, a network node (e.g., location server, base station) comprises a radio resource determining module for determining a set of one or more radio resources on which positioning measurements are to be performed by a group of cells on a device-unique reference signal transmitted by the wireless device. Further, the network node comprises a radio resource assigning module for assigning the set or individual radio resources in the set to the group of cells.

According to another aspect, the network node may include a receiving module for receiving the position measurements from the group of cells.

According to another aspect, the network node may include a position determining module for determining the position of the wireless device based on the position measurements from the group of cells.

According to another aspect, the network node may include a transmitting module for transmitting, to one or more network nodes associated with the group of cells, an indication of the set or the individual radio resources in the set.

According to another aspect, the network node may include a reference signal configuration determining module for determining a configuration of the reference signal to be transmitted by the wireless device. The network node may include a transmitting module for transmitting, to the wireless device via a serving network node, an indication of the configuration of the reference signal.

According to another aspect, the network node may include a cell group determining module for determining which of a plurality of cells form the group of cells.

According to another aspect, the network node may include a cell group associating module for determining which of a plurality of cell groups are associated with the wireless device.

According to one aspect, a network node (e.g., location server, base station) is configured to determine a set of one or more radio resources on which positioning measurements are to be performed by a group of cells on a device-unique reference signal transmitted by the wireless device. Further, the network node is configured to assign the set or individual radio resources in the set to the group of cells.

According to another aspect, the network node may be configured to receive the position measurements from the group of cells.

According to another aspect, the network node may be configured to determine the position of the wireless device based on the position measurements from the group of cells.

According to another aspect, the network node may be configured to transmit, to one or more network nodes associated with the group of cells, an indication of the set or the individual radio resources in the set.

According to another aspect, the network node may be configured to determine a configuration of the reference signal to be transmitted by the wireless device. Further, the network node may be configured to transmit, to the wireless device via a serving network node, an indication of the configuration of the reference signal.

According to another aspect, the network node may be configured to determine which of a plurality of cells form the group of cells.

According to another aspect, the network node may be configured to determine which of a plurality of cell groups are associated with the wireless device.

According to one aspect, a network node (e.g., location server, base station) comprises a processor and a memory. The memory contains instructions, executable by the processor, whereby the network node is configured to determine a set of one or more radio resources on which positioning measurements are to be performed by a group of cells on a device-unique reference signal transmitted by the wireless device. The memory also contains instructions whereby the network node is configured to assign the set or individual radio resources in the set to the group of cells.

According to another aspect, the memory may contain instructions whereby the network node is configured to receive the position measurements from the group of cells.

According to another aspect, the memory may contain instructions whereby the network node is configured to determine the position of the wireless device based on the position measurements from the group of cells.

According to another aspect, the memory may contain instructions whereby the network node is configured to transmit, to one or more network nodes associated with the group of cells, an indication of the set or the individual radio resources in the set.

According to another aspect, the memory may contain instructions whereby the network node is configured to determine a configuration of the reference signal to be transmitted by the wireless device. Further, the memory may contain instructions whereby the network node is configured to transmit, to the wireless device via a serving network node, an indication of the configuration of the reference signal.

According to another aspect, the memory may contain instructions whereby the network node is configured to determine which of a plurality of cells form the group of cells.

According to another aspect, the memory may contain instructions whereby the network node is configured to determine which of a plurality of cell groups are associated with the wireless device.

According to one aspect, a computer program, comprising instructions which, when executed on at least one processor of a network node (e.g., location server, base station), cause the at least one processor to carry out any of the methods or portions thereof, individually or in combination, as described herein. In addition, a carrier may contain the computer program with the carrier being one of an electronic signal, optical signal, radio signal, or computer readable storage medium.

According to one aspect, a method performed by a network node (e.g., base station) comprises obtaining a set of one or more radio resources or individual resources in the set on which positioning measurements are to be performed by a group of cells on a device-unique reference signal transmitted by the wireless device. Further, the method comprises assigning the set or individual radio resources in the set to the wireless device.

According to another aspect, the method may include receiving, from a cell of the network node, the device-unique reference signal transmitted by the wireless device.

According to another aspect, the method may include determining a position measurement of the wireless device based on the received reference signal.

According to another aspect, the method may include receiving, from another network node, an indication of the set of one or more radio resources or the individual resources in the set.

According to another aspect, the method may include transmitting, to the wireless device, an indication of the set of one or more radio resources or the individual resources in the set.

According to another aspect, the method may include receiving, from another network node, a configuration of the reference signal to be transmitted by the wireless device. Further, the method may include sending, to the wireless device, the configuration of the reference signal to be transmitted by the wireless device.

According to another aspect, the method may include determining a configuration of the reference signal unique to the wireless device based on the configuration of the reference signal.

According to another aspect, the network node may be a base station.

According to another aspect, at least one of the cells of the group of cells may be associated with the network node.

According to another aspect, at least one of the cells of the group of cells may be associated with a different network node.

According to another aspect, the method may include determining which of a plurality of cells form the group of cells.

According to another aspect, the method may include determining which of a plurality of cell groups are associated with the wireless device.

According to one aspect, a network node (e.g., base station) comprises a radio resource obtainer circuit configured to obtain a set of one or more radio resources or individual resources in the set on which positioning measurements are to be performed by a group of cells on a device-unique reference signal transmitted by the wireless device. Further, the network node comprises a radio resource assignor circuit configured to assign the set or individual radio resources in the set to the wireless device.

According to another aspect, the network node may include a receiver configured to receive, from a cell of the network node, the device-unique reference signal transmitted by the wireless device.

According to another aspect, the network node may include a position determination circuit configured to determine a position measurement of the wireless device based on the received reference signal.

According to another aspect, the network node may include a receiver configured to receive, from another network node, an indication of the set of one or more radio resources or the individual resources in the set.

According to another aspect, the network node may include a transmitter configured to transmit, to the wireless device, an indication of the set of one or more radio resources or the individual resources in the set.

According to another aspect, the network node may include a receiver configured to receive, from another network node, a configuration of the reference signal to be transmitted by the wireless device. The network node may also include a transmitter configured to transmit, to the wireless device, the configuration of the reference signal to be transmitted by the wireless device.

According to another aspect, the network node may include a reference signal configuration determination circuit configured to determine a configuration of the reference signal unique to the wireless device based on the configuration of the reference signal.

According to another aspect, the network node may include a cell group determination circuit configured to determine which of a plurality of cells form the group of cells.

According to another aspect, the network node may include a cell group association circuit configured to determine which of a plurality of cell groups are associated with the wireless device.

According to one aspect, a network node (e.g., base station) comprises a radio resource obtaining module for obtaining a set of one or more radio resources or individual resources in the set on which positioning measurements are to be performed by a group of cells on a device-unique reference signal transmitted by the wireless device. Further, the network node comprises a radio resource assigning module for assigning the set or individual radio resources in the set to the wireless device.

According to another aspect, the network node may include a receiving module for receiving, from a cell of the network node, the device-unique reference signal transmitted by the wireless device.

According to another aspect, the network node may include a position determining module for determining a position measurement of the wireless device based on the received reference signal.

According to another aspect, the network node may include a receiving module for receiving, from another network node, an indication of the set of one or more radio resources or the individual resources in the set.

According to another aspect, the network node may include a transmitting module for transmitting, to the wireless device, an indication of the set of one or more radio resources or the individual resources in the set.

According to another aspect, the network node may include a receiving module for receiving, from another network node, a configuration of the reference signal to be transmitted by the wireless device. Further, the network node may include a transmitting module for transmitting, to the wireless device, the configuration of the reference signal to be transmitted by the wireless device.

According to another aspect, the network node may include a reference signal configuration determining module for determining a configuration of the reference signal unique to the wireless device based on the configuration of the reference signal.

According to another aspect, the network node may include a cell group determining module for determining which of a plurality of cells form the group of cells.

According to another aspect, the network node may include a cell group associating module for determining which of a plurality of cell groups are associated with the wireless device.

According to one aspect, a network node is configured to obtain a set of one or more radio resources or individual resources in the set on which positioning measurements are to be performed by a group of cells on a device-unique reference signal transmitted by the wireless device. Further, the network node is configured to assign the set or individual radio resources in the set to the wireless device.

According to another aspect, the network node may be configured to receive, from a cell of the network node, the device-unique reference signal transmitted by the wireless device.

According to another aspect, the network node may be configured to determine a position measurement of the wireless device based on the received reference signal.

According to another aspect, the network node may be configured to receive, from another network node, an indication of the set of one or more radio resources or the individual resources in the set.

According to another aspect, the network node may be configured to transmit, to the wireless device, an indication of the set of one or more radio resources or the individual resources in the set.

According to another aspect, the network node may be configured to receive, from another network node, a configuration of the reference signal to be transmitted by the wireless device. Further, the network node may be configured to send, to the wireless device, the configuration of the reference signal to be transmitted by the wireless device.

According to another aspect, the network node may be configured to determine a configuration of the reference signal unique to the wireless device based on the configuration of the reference signal.

According to another aspect, the network node may be configured to determine which of a plurality of cells form the group of cells.

According to another aspect, the network node may be configured to determine which of a plurality of cell groups are associated with the wireless device.

According to one aspect, a network node (e.g., base station) comprises a processor and a memory. The memory contains instructions, executable by the processor, whereby the network node is configured to obtain a set of one or more radio resources or individual resources in the set on which positioning measurements are to be performed by a group of cells on a device-unique reference signal transmitted by the wireless device. The memory also contains instructions whereby the network node is configured to assign the set or individual radio resources in the set to the wireless device.

According to another aspect, the memory may contain instructions whereby the network node is configured to receive, from a cell of the network node, the device-unique reference signal transmitted by the wireless device.

According to another aspect, the memory may contain instructions whereby the network node is configured to determine a position measurement of the wireless device based on the received reference signal.

According to another aspect, the memory may contain instructions whereby the network node is configured to receive, from another network node, an indication of the set of one or more radio resources or the individual resources in the set.

According to another aspect, the memory may contain instructions whereby the network node is configured to transmit, to the wireless device, an indication of the set of one or more radio resources or the individual resources in the set.

According to another aspect, the memory may contain instructions whereby the network node is configured to receive, from another network node, a configuration of the reference signal to be transmitted by the wireless device. Further, the memory may contain instructions whereby the network node is configured to transmit, to the wireless device, the configuration of the reference signal to be transmitted by the wireless device.

According to another aspect, the memory may contain instructions whereby the network node is configured to determine a configuration of the reference signal unique to the wireless device based on the configuration of the reference signal.

According to another aspect, the memory may contain instructions whereby the network node is configured to determine which of a plurality of cells form the group of cells.

According to another aspect, the memory may contain instructions whereby the network node is configured to determine which of a plurality of cell groups are associated with the wireless device.

According to one aspect, a computer program, comprising instructions which, when executed on at least one processor of a network node (e.g., base station), cause the at least one processor to carry out any of the methods or portions thereof, individually or in combination, as described herein. In addition, a carrier may contain the computer program with the carrier being one of an electronic signal, optical signal, radio signal, or computer readable storage medium.

According to one aspect, a method performed by a wireless device (e.g., UE) comprises obtaining a set of one or more radio resources or individual resources in the set on which positioning measurements are to be performed by a group of cells on a device-unique reference signal transmitted by the wireless device. Further, the method includes transmitting the reference signal on the set of one or more radio resources or the individual resources in the set.

According to another aspect, the method may include receiving, from a network node (e.g., base station), the set of one or more radio resources or the individual resources in the set.

According to another aspect, the method may include receiving, from a network node (e.g., base station), an indication of a configuration of the reference signal to be transmitted by the wireless device. Also, the method may include configuring the reference signal based on the configuration.

According to another aspect, the method may include transmitting the reference signal on the set of one or more radio resources to the group of cells.

According to another aspect, the method may include transmitting the reference signal to each of the group of cells that corresponds to the individual resources in the set of one or more radio resources.

According to another aspect, the method may include transmitting the reference signal using the set of one or more radio resources at a first time. In addition, the method may include transmitting the reference signal using the set of one or more radio resources at a second time. Further, the set of one or more radio resources may also be assigned to a second group of cells.

According to another aspect, at least one network node may be common between the first and second group of cells.

According to another aspect, the wireless device may be a user equipment (UE).

According to one aspect, a wireless device (e.g., UE) comprises a radio resource obtainer circuit configured to obtain a set of one or more radio resources or individual resources in the set on which positioning measurements are to be performed by a group of cells on a device-unique reference signal transmitted by the wireless device. Further, the wireless device comprises a transmitter configured to transmit the reference signal on the set of one or more radio resources or the individual resources in the set.

According to another aspect, the wireless device may include a receiver configured to receive, from a network node, the set of one or more radio resources or the individual resources in the set.

According to another aspect, the wireless device may include a receiver configured to receive, from a network node, an indication of a configuration of the reference signal to be transmitted by the wireless device. Also, the wireless device may include a reference signal configuration circuit configured to configure the reference signal based on the configuration.

According to another aspect, the transmitter may be further configured to transmit the reference signal on the set of one or more radio resources to the group of cells.

According to another aspect, the transmitter may be further configured to transmit the reference signal to each of the group of cells that corresponds to the individual resources in the set of one or more radio resources.

According to another aspect, the transmitter may be further configured to transmit the reference signal using the set of one or more radio resources at a first time. In addition, the transmitter may be further configured to transmit the reference signal using the set of one or more radio resources at a second time. Also, the set of one or more radio resources may also be assigned to a second group of cells.

According to one aspect, a wireless device (e.g., UE) comprises a radio resource obtaining module for obtaining a set of one or more radio resources or individual resources in the set on which positioning measurements are to be performed by a group of cells on a device-unique reference signal transmitted by the wireless device. Further, the wireless device comprises a transmitting module for transmitting the reference signal on the set of one or more radio resources or the individual resources in the set.

According to another aspect, the wireless device may comprise a receiving module for receiving, from a network node, the set of one or more radio resources or the individual resources in the set.

According to another aspect, the wireless device may comprise a receiving module for receiving, from a network node, an indication of a configuration of the reference signal to be transmitted by the wireless device. Further, the wireless device may comprise a reference signal configuring module for configuring the reference signal based on the configuration.

According to another aspect, the transmitting module may also include transmitting the reference signal on the set of one or more radio resources to the group of cells.

According to another aspect, the transmitting module may also include transmitting the reference signal to each of the group of cells that corresponds to the individual resources in the set of one or more radio resources.

According to another aspect, the transmitting module may also include transmitting the reference signal using the set of one or more radio resources at a first time. The transmitting module may also include transmitting the reference signal using the set of one or more radio resources at a second time. Also, the set of one or more radio resources may also be assigned to a second group of cells.

According to one aspect, a wireless device (e.g., UE) is configured to obtain a set of one or more radio resources or individual resources in the set on which positioning measurements are to be performed by a group of cells on a device-unique reference signal transmitted by the wireless device. Further, the wireless device is configured to transmit the reference signal on the set of one or more radio resources or the individual resources in the set.

According to another aspect, the wireless device may be further configured to receive, from a network node, the set of one or more radio resources or the individual resources in the set.

According to another aspect, the wireless device may be further configured to receive, from a network node, an indication of a configuration of the reference signal to be transmitted by the wireless device. Also, the wireless device may be further configured to configure the reference signal based on the configuration.

According to another aspect, the transmitter may be further configured to transmit the reference signal on the set of one or more radio resources to the group of cells.

According to another aspect, the transmitter may be further configured to transmit the reference signal to each of the group of cells that corresponds to the individual resources in the set of one or more radio resources.

According to another aspect, the transmitter may be further configured to transmit the reference signal using the set of one or more radio resources at a first time. In addition, the transmitter may be further configured to transmit the reference signal using the set of one or more radio resources at a second time. Also, the set of one or more radio resources may also be assigned to a second group of cells.

According to one aspect, a wireless device (e.g., UE) comprises a processor and a memory. The memory contains instructions, executable by the processor, whereby the wireless device is configured to obtain a set of one or more radio resources or individual resources in the set on which positioning measurements are to be performed by a group of cells on a device-unique reference signal transmitted by the wireless device. Further, the memory contains instructions whereby the wireless device is configured to transmit the reference signal on the set of one or more radio resources or the individual resources in the set.

According to another aspect, the memory may contain instructions whereby the wireless device is further configured to receive, from a network node, the set of one or more radio resources or the individual resources in the set.

According to another aspect, the memory may contain instructions whereby the wireless device is further configured to receive, from a network node, an indication of a configuration of the reference signal to be transmitted by the wireless device. Also, the memory may contain instructions whereby the wireless device is further configured to configure the reference signal based on the configuration.

According to another aspect, the memory may contain instructions whereby the wireless device is further configured to transmit the reference signal on the set of one or more radio resources to the group of cells.

According to another aspect, the memory may contain instructions whereby the wireless device is further configured to transmit the reference signal to each of the group of cells that corresponds to the individual resources in the set of one or more radio resources.

According to another aspect, the memory may contain instructions whereby the wireless device is further configured to transmit the reference signal using the set of one or more radio resources at a first time. In addition, the memory may contain instructions whereby the wireless device is further configured to transmit the reference signal using the set of one or more radio resources at a second time. Also, the set of one or more radio resources may also be assigned to the second group of cells.

According to one aspect, a computer program, comprising instructions which, when executed on at least one processor of a wireless device (e.g., UE), cause the at least one processor to carry out any of the methods or portions thereof, individually or in combination, as described herein. In addition, a carrier may contain the computer program with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

This disclosure describes, among other things, techniques for using a device-unique reference signal (e.g., NPRACH-like signal) to enable uplink-based positioning. For instance, one technique is for the network to flexibly configure uplink resources to enable the uplink-based positioning. Advantages of the techniques described herein include reduced computational effort by a wireless device (e.g., UE) such that the only task that the wireless device would need to perform in support of uplink-based positioning is to receive a positioning request and in response, generate and transmit a device-unique reference signal. Further, uplink-based positioning allows base stations (e.g., eNBs) to more effectively use advanced signal detection algorithms for detecting time of arrival (TOA) of the device-unique reference signals than a wireless device would use for performing a similar function for downlink-based positioning. Also, the device-unique reference signal such as an NPRACH-like signal limits the impact on the network design while increasing coverage and not requiring a network node having an LMU. In addition, the device-unique reference signal such as an NPRACH-like signal uniquely identifies the wireless device and thereby reduces the amount of signaling information transferred in support of uplink-based positioning.

Figure 1:
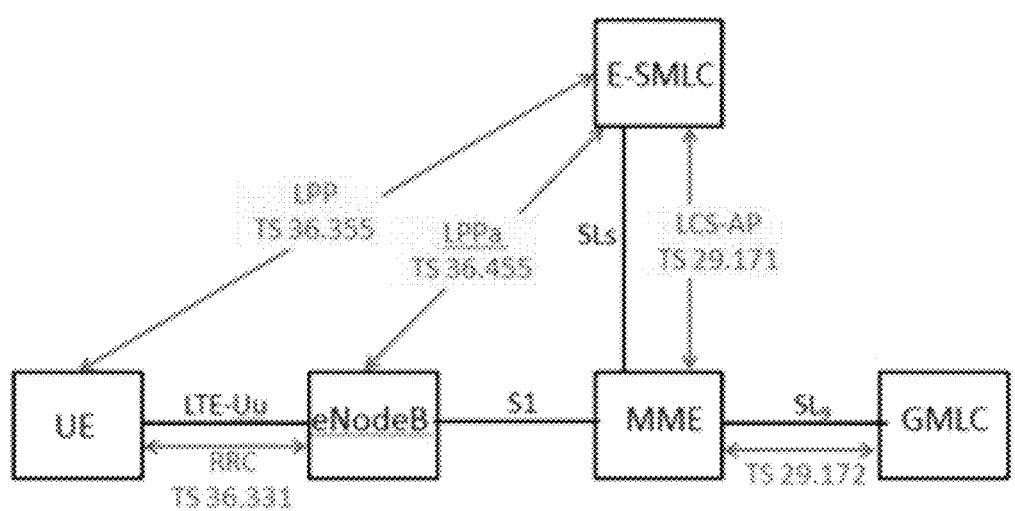
FIG. 1 illustrate an LTE network architecture having a positioning server (e.g., an E-SMLC).
Figure 2:
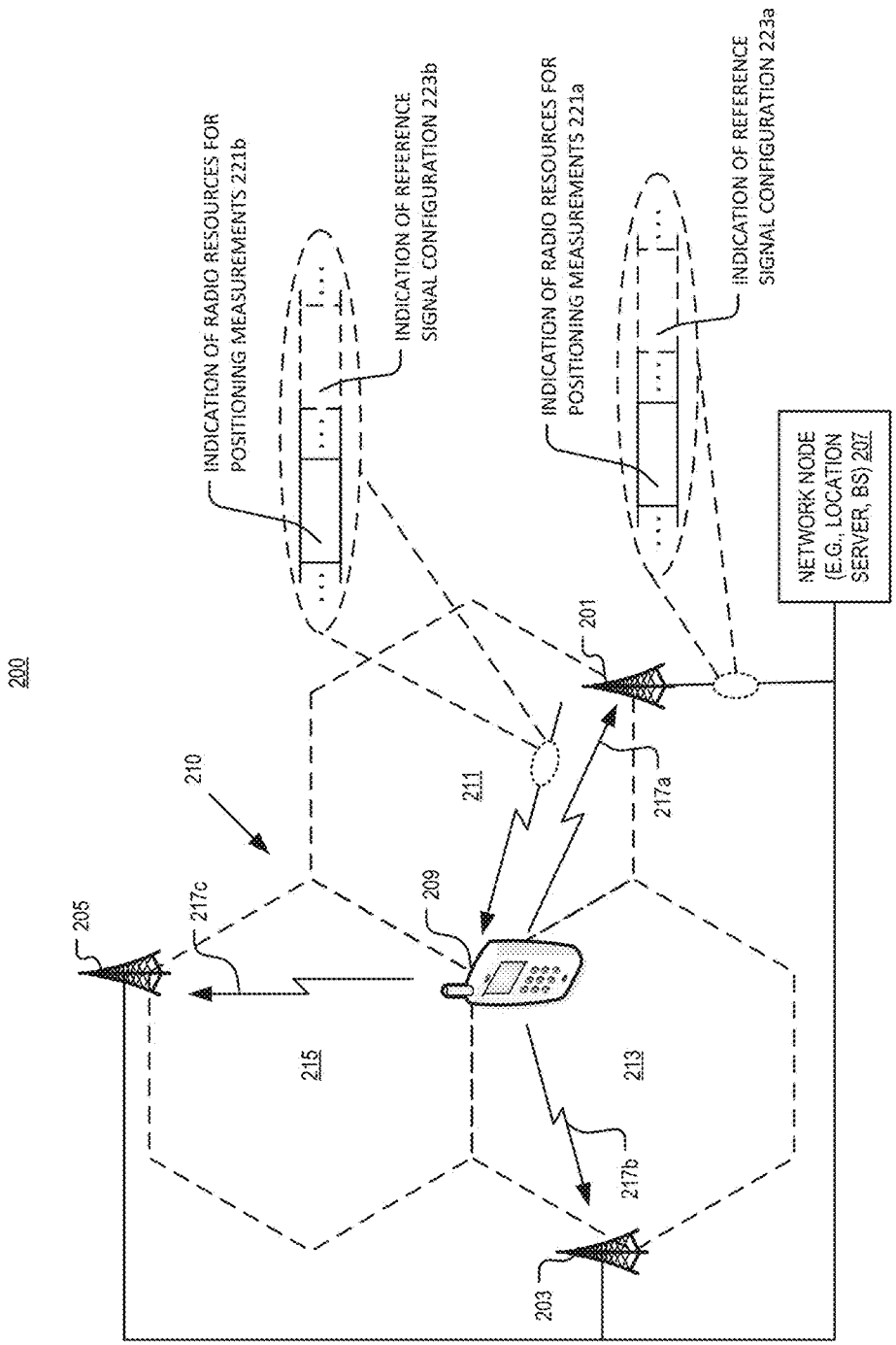
FIG. 2 illustrates one embodiment of a system for determining a position of a wireless device in accordance with various aspects as described herein.

As mentioned, this disclosure describes techniques for using a device-unique reference signal to enable uplink-based positioning. For example, FIG. 2 illustrates one embodiment of a system 200 for determining a position of a wireless device 209 in accordance with various aspects as described herein. In FIG. 2, a network node 207 (e.g., location server, base station) determines a set of one or more radio resources 221a (e.g., time and frequency resources) on which positioning measurements are to be performed by a group of cells 210 (e.g., positioning cluster) on a device-unique reference signal 217a-c transmitted by the wireless device 209. Further, the network node 207 assigns the set of one or more radio resources 221a or individual radio resources in the set 221a to the group of cells 210. The network node 207 may then transmit, to the group of cells 210, an indication of the set 221a or the individual radio resources in the set 221a. In addition, the network node 207 may determine a configuration 223a of a reference signal to be transmitted by the wireless device 209. The network node 207 may then transmit, to the network node 201 serving the wireless device 209, an indication of the reference signal configuration 223a. Each cell 211, 213, 215 in the group 210 may correspond to the same network node to a different network node. In one example, each cell in a group may correspond to different network nodes (e.g., base stations) as show in FIG. 2 with each cell 211, 213, 215 corresponding to a respective network node 201, 203, 205. In another example, each cell in a group may correspond to a different sector of a network node (e.g., base station). In yet another example, some cells in a group correspond to different network nodes (e.g., base stations) while the other cells in the group correspond to different sectors of the same network node.

In FIG. 2, the network node 201 (e.g., base station) may receive, from the network node 207, the indication of the set 221a or the individual resources in the set 221a. Further, the network node 201 assigns the set 221a or the individual resources in the set 221a to the wireless device 209. The network node 201 may then transmit, to the wireless device 209, an indication of the set 221b or the individual resources in the set 221b. The network node 201 may receive, from the network node 207, the indication of the reference signal configuration 223a. In addition, the network node 201 may determine a device-unique reference signal configuration 223b for the wireless device 209. The network node 201 may then transmit, to the wireless device 209, an indication of the device-unique reference signal configuration 223b.

Furthermore, the wireless device 209 may receive, from the network node 201, the set 221b or the individual resources in the set 221b. Also, the wireless device 209 may receive, from the network node 201, the device-unique reference signal configuration 223b. The wireless device 209 may configure a reference signal based on the configuration 223b. Further, the wireless device may transmit the reference signal on the set 221b or the individual resources in the set 221b, the transmission of which are indicated by references 217a-c. The transmission(s) of the reference signal(s) 217a-c may be a single transmission (e.g., multicast transmission) or multiple transmissions (e.g., unicast transmissions) to each cell 211, 213, 215. Each network node 201, 203, 205 may then receive the device-unique reference signal transmissions 217a-c by the wireless device 209. Each network node 201, 203, 205 may determine a position measurement of the wireless device 209 based on the device-unique reference signal transmissions 217a-c. Further, each network node 201, 203, 205 may transmit, to the network node 207, an indication of the position measurement. Finally, the network node 207 may receive the position measurements and may then determine the position of the wireless device 209 based on the position measurements.

Additionally or alternatively, the network node 207 may be configured to support a wireless communication system (e.g., NB-IoT, NR, LTE, LTE-NR, 5G, UMTS, GSM, or the like). Also, the network node 207 may be a location server such as an E-SMLC, a base station such as an eNodeB, or the like. Further, the network node may include both a location server and a base station. Each network node 201, 203, 207 may be configured to support a wireless communication system (e.g., NB-IoT, NR, LTE, LTE-NR, 5G, UMTS, GSM, or the like). Also, each network node 201, 203, 207 may be a base station (e.g., eNB), a sector of a base station, a picocell, an access point, a wireless router, or the like. Each network node 201, 203, 205 may communicate with each other, with the network node 207, with the wireless device 209, or any combination thereof. The wireless device 209 may be configured to support a wireless communication system (e.g., NB-IoT, NR, LTE, LTE-NR, 5G, UMTS, GSM, or the like). The wireless device 209 may be a UE, a mobile station (MS), a machine-to-machine (M2M) device, a machine-type communications (MTC) device, a NB-IoT device, a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, a device capable of machine type communication (MTC), or the like.

Figure 3:
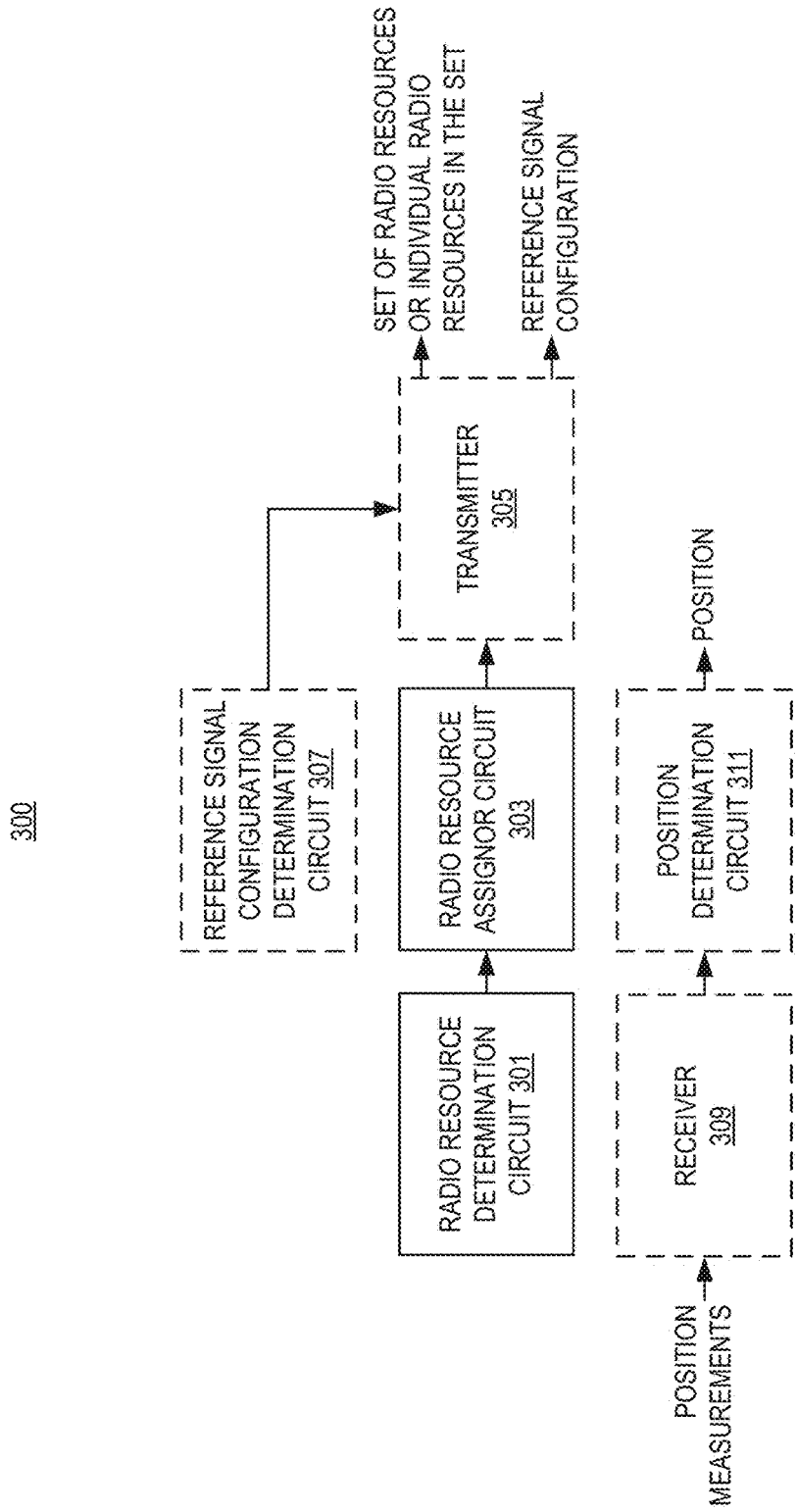
FIG. 3 illustrates one embodiment of a network node (e.g., location server, base station) for determining a position of a wireless device in accordance with various aspects as described herein.

FIG. 3 illustrates one embodiment of a network node 300 (e.g., location server, base station) for determining a position of a wireless device in accordance with various aspects as described herein. In FIG. 3, the network node 300 may include a radio resource determination circuit 301, a radio resource assignor circuit 303, a transmitter 305, a reference signal configuration determination circuit 307, a receiver circuit 309, and a position determination circuit 311, the like, or any combination thereof. The radio resource determination circuit 301 may be configured to determine a set of one or more radio resources on which positioning measurements are to be performed by a group of cells on a device-unique reference signal transmitted by the wireless device. Further, the radio resource assignor circuit 303 may be configured to assign the set or individual resources in the set to the group of cells. The transmitter circuit 305 may then transmit, to the group of cells, an indication of the set or the individual radio resources in the set. In addition, the reference signal configuration determination circuit 307 may be configured to determine a configuration of the reference signal to be transmitted by the wireless device. The transmitter circuit 305 may be further configured to transmit, to the wireless device, an indication of the configuration of the reference signal. Also, the receiver circuit 309 may be configured to receive the position measurements from the group of cells. The position determination circuit 311 may then determine the position of the wireless device based on the position measurements from the group of cells.

Figure 4:
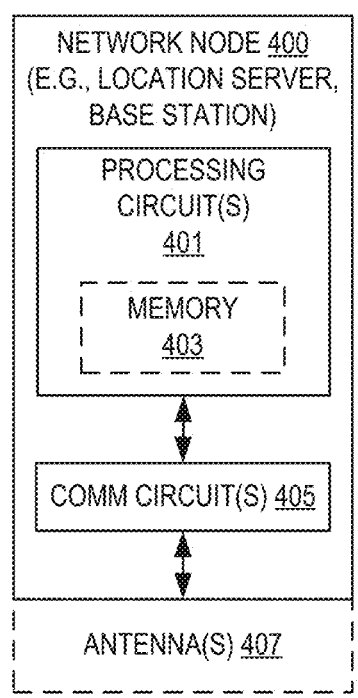
FIG. 4 illustrates another embodiment of a network node (e.g., location server, base station) for determining a position of a wireless device in accordance with various aspects as described herein.

FIG. 4 illustrates another embodiment of a network node 400 (e.g., location server, base station) for determining a position of a wireless device in accordance with various aspects as described herein. In FIG. 4, the network node 400 may include processing circuit(s) 401, communications circuit(s) 405, antenna(s) 407, the like, or any combination thereof. The communication circuit(s) 405 may be configured to transmit or receive information to or from one or more network nodes or one or more wireless devices via any communication technology. This communication may occur using the one or more antennas 407 that are either internal or external to the network node 400. The processing circuit(s) 401 may be configured to perform processing as described herein (e.g., the method of FIG. 6) such as by executing program instructions stored in memory 403. The processing circuit(s) 401 in this regard may implement certain functional means, units, or modules.

Figure 5:
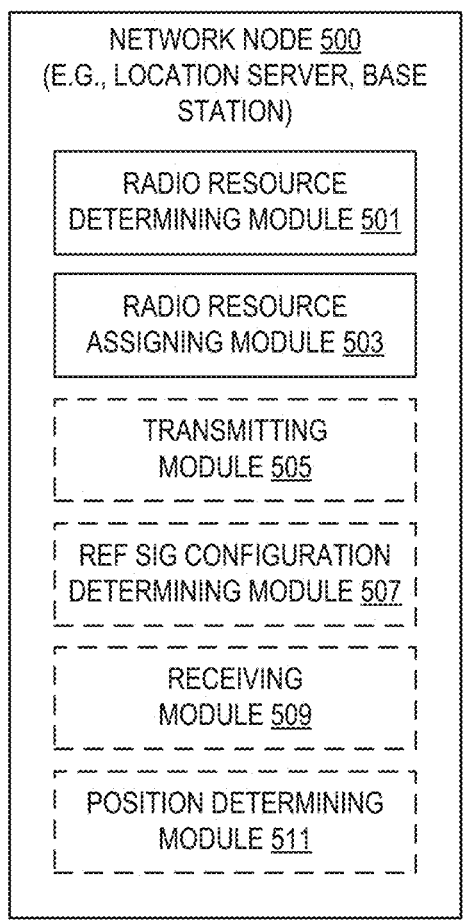
FIG. 5 illustrates another embodiment of a network node (e.g., location server, base station) for determining a position of a wireless device in accordance with various aspects as described herein.

FIG. 5 illustrates one embodiment of a network node 500 (e.g., location server, base station) for determining a position of a wireless device in accordance with various aspects as described herein. In FIG. 5, the network node 500 may implement various functional means, units, or modules (e.g., via the processing circuit(s) 401 of FIG. 4 or via software). These functional means, units, or modules (e.g., for implementing the method of FIG. 6) include a radio resource determining module or unit 501 for determining a set of one or more radio resources on which positioning measurements are to be performed by a group of cells on a device-unique reference signal transmitted by the wireless device. These functional means, units, or modules also include a radio resource assigning module or unit 503 for assigning the set or individual radio resources in the set to the group of cells. Further, these functional means, units, or modules may include a transmitting module or unit 505 for transmitting, to the group of cells, an indication of the set or the individual radio resources in the set. Also, these functional means, units, or modules may include a reference signal configuration determining module or unit 507 for determining a configuration of the reference signal to be transmitted by the wireless device. The transmitter module or unit 505 may also include transmitting, to the wireless device, an indication of the configuration of the reference signal. In addition, these functional means, units, or modules may include a receiving module or unit 509 for receiving the position measurements from the group of cells. Finally, these functional means, units, or modules may include a positioning determining module or unit 511 for determining the position of the wireless device based on the position measurements from the group of cells.

Figure 6:
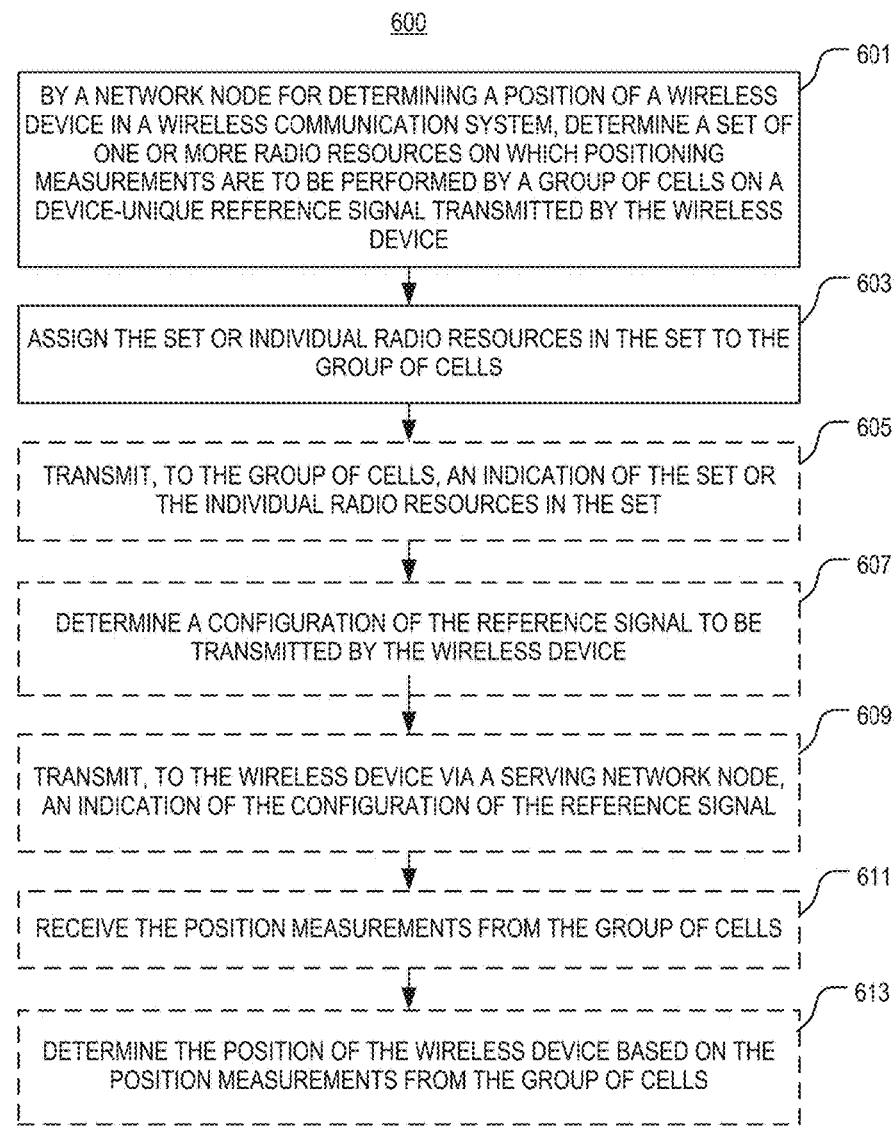
FIG. 6 illustrates one embodiment of a method by a network node (e.g., location server, base station) for determining a position of a wireless device in accordance with various aspects as described herein.

FIG. 6 illustrates one embodiment of a method 600 by a network node (e.g., location server, base station) for determining a position of a wireless device in accordance with various aspects as described herein. In FIG. 6, the method 600 may start, for instance, at block 601 where it includes determining a set of one or more radio resources on which positioning measurements are to be performed by a group of cells on a device-unique reference signal transmitted by the wireless device. At block 603, the method 600 includes assigning the set or individual radio resources in the set to the group of cells. At block 605, the method 600 may include transmitting, to the group of cells, an indication of the set or the individual radio resources in the set. At block 607, the method 600 may include determining a configuration of the reference signal to be transmitted by the wireless device. At block 609, the method 600 may include transmitting, to the wireless device, an indication of the configuration of the reference signal. At block 611, the method 600 may include receiving the position measurements from the group of cells. At block 613, the method 600 may include determining the position of the wireless device based on the position measurements from the group of cells.

Figure 7:
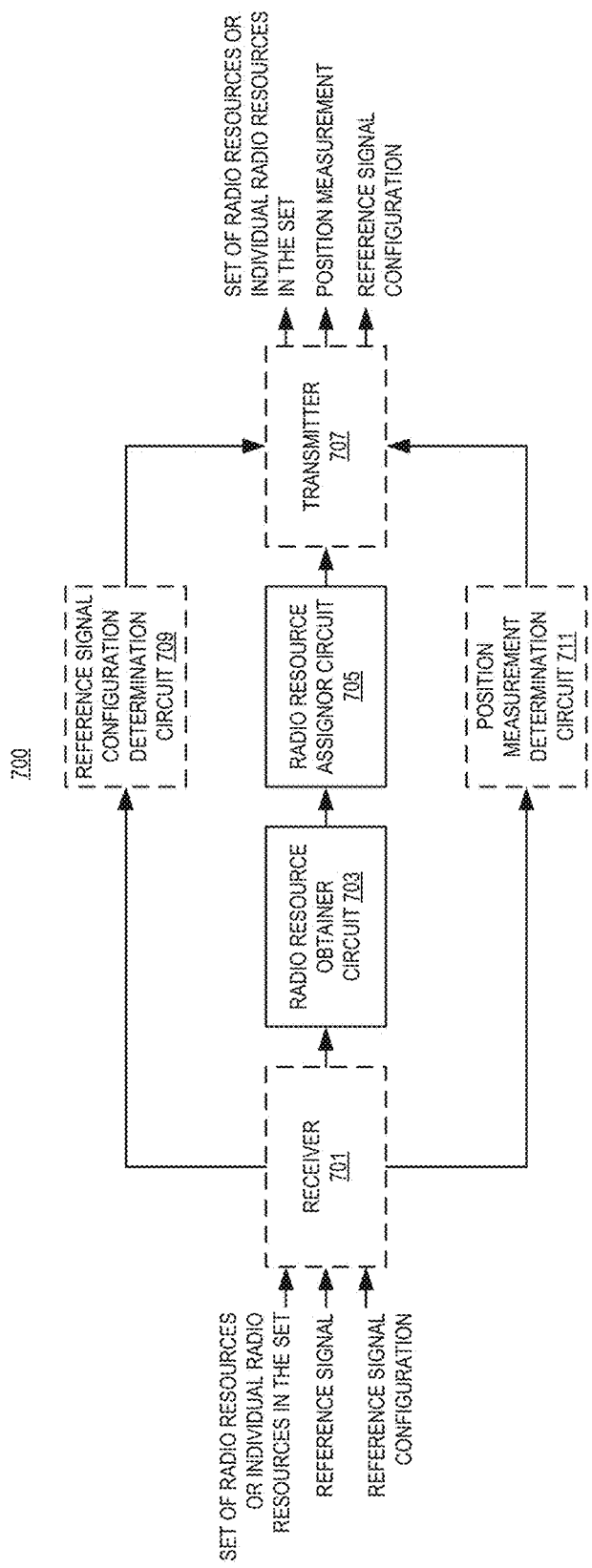
FIG. 7 illustrates one embodiment of a network node (e.g., base station) for determining a position of a wireless device in accordance with various aspects as described herein.

FIG. 7 illustrates one embodiment of a network node 700 (e.g., base station) for determining a position of a wireless device in accordance with various aspects as described herein. In FIG. 7, the network node 700 may include a receiver circuit 701, a radio resource obtainer circuit 703, a radio resource assignor circuit 705, a transmitter 707, a reference signal configuration determination circuit 709, a position measurement determination circuit 711, the like, or any combination thereof. The receive circuit 701 may be configured to receive, from another network node (e.g., location server, base station), an indication of the set of one or more radio resources or the individual resources in the set. The radio resource obtainer circuit 703 is configured to obtain a set of one or more radio resources or individual resources in the set on which positioning measurements are to be performed by a group of cells on a device-unique reference signal transmitted by the wireless device. The radio resource assignor circuit 705 is configured to assign the set or individual radio resources in the set to the wireless device. The transmitter circuit 707 may be configured to transmit, to the wireless device, an indication of the set of one or more radio resources or the individual resources in the set.

In FIG. 7, the receiver circuit 701 may also be configured to receive, from the other network node, an indication of a configuration of the reference signal. The reference signal configuration determination circuit 709 may be configured to determine a configuration of the reference signal unique to the wireless device based on the configuration of the reference signal. The transmitter circuit 707 may also be configured to transmit, to the wireless device, an indication of the configuration of the reference signal to be transmitted by the wireless device. The receiver circuit 701 may also be configured to receive, from a cell of the network node, the device-unique reference signal transmitted by the wireless device. The position measurement determination circuit 711 may be configured to determine a position measurement of the wireless device based on the received reference signal. The transmitter circuit 707 may also be configured to transmit, to the other network node, an indication of the position of the position measurement.

Figure 8:
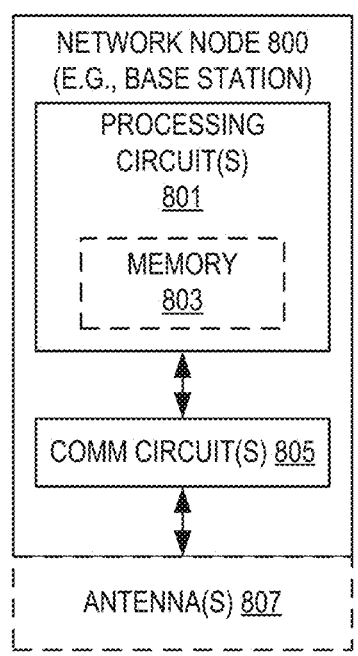
FIG. 8 illustrates another embodiment of a network node (e.g., base station) for determining a position of a wireless device in accordance with various aspects as described herein.

FIG. 8 illustrates another embodiment of a network node 800 (e.g., base station) for determining a position of a wireless device in accordance with various aspects as described herein. In FIG. 8, the network node 800 may include processing circuit(s) 801, communications circuit(s) 805, antenna(s) 807, the like, or any combination thereof. The communication circuit(s) 805 may be configured to transmit or receive information to or from one or more network nodes or one or more wireless devices via any communication technology. This communication may occur using the one or more antennas 807 that are either internal or external to the network node 800. The processing circuit(s) 801 may be configured to perform processing as described herein (e.g., the method of FIG. 10) such as by executing program instructions stored in memory 803. The processing circuit(s) 801 in this regard may implement certain functional means, units, or modules.

Figure 9:
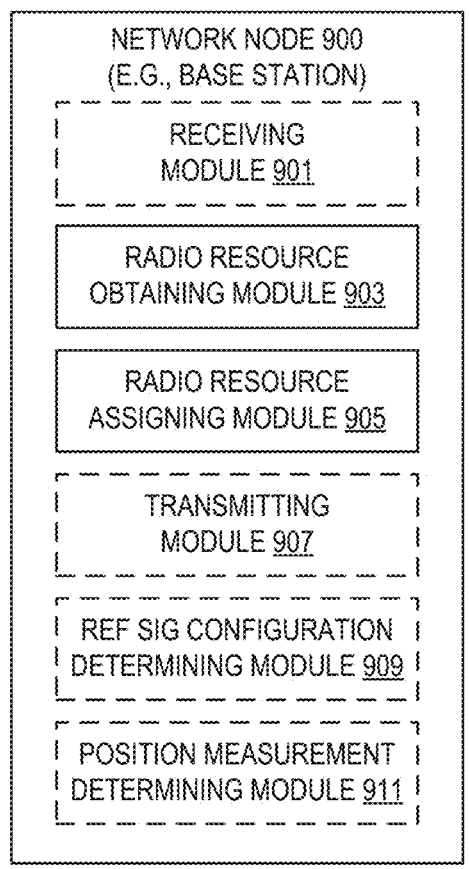
FIG. 9 illustrates another embodiment of a network node (e.g., base station) for determining a position of a wireless device in accordance with various aspects as described herein.

FIG. 9 illustrates one embodiment of a network node 900 (e.g., base station) for determining a position of a wireless device in accordance with various aspects as described herein. In FIG. 9, the network node 900 may implement various functional means, units, or modules (e.g., via the processing circuit(s) 801 of FIG. 8 or via software). These functional means, units, or modules (e.g., for implementing the method of FIG. 10) may include a receiving module or unit 901 for receiving, from another network node, an indication of the set of one or more radio resources or the individual resources in the set. Further, these functional means, units, or modules include a radio resource obtaining module or unit 903 for obtaining a set of one or more radio resources or individual resources in the set on which positioning measurements are to be performed by a group of cells on a device-unique reference signal transmitted by the wireless device. Also, these functional means, units, or modules include a radio resource assigning module or unit 905 for assigning the set or individual radio resources in the set to the wireless device.

In FIG. 9, these functional means, units, or modules may include a transmitting module or unit 907 for transmitting, to the wireless device, an indication of the set of one or more radio resources or the individual resources in the set. The receiving module or unit 901 may also include receiving, from the other network node, an indication of a configuration of the reference signal. In addition, these functional means, units, or modules may include a reference signal configuration determining module or unit 909 for determining a configuration of the reference signal unique to the wireless device based on the configuration of the reference signal. The transmitting module or unit 907 may also include transmitting, to the wireless device, an indication of the configuration of the reference signal to be transmitted by the wireless device. Further, the receiving module or unit 901 may include receiving, from a cell of the network node, the device-unique reference signal transmitted by the wireless device. These functional means, units, or modules may include a position measurement determining module or unit 911 for determining a position measurement of the wireless device based on the received reference signal. Also, the transmitting module or unit 907 may include transmitting, to the other network node, an indication of the position measurement.

Figure 10:
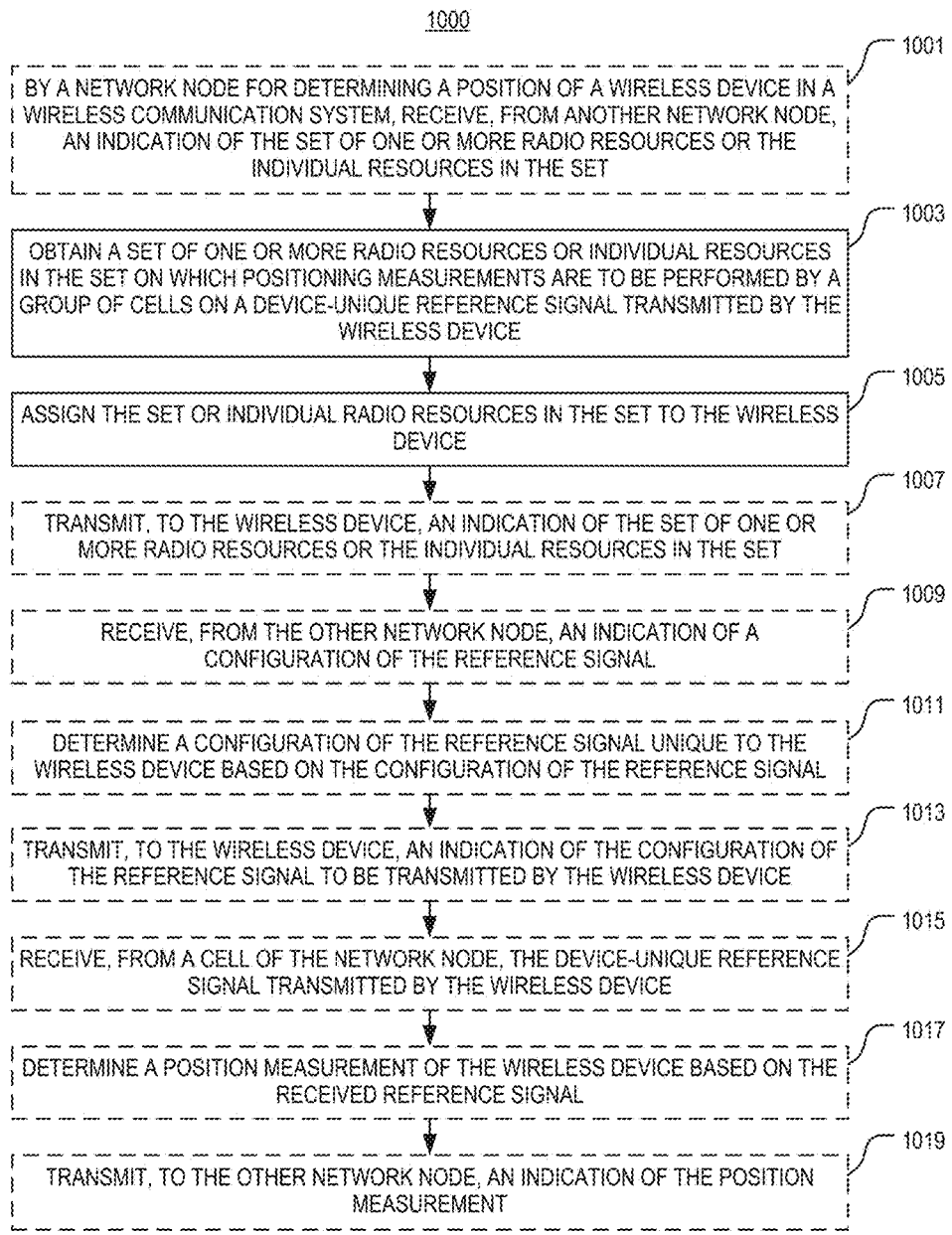
FIG. 10 illustrates one embodiment of a method by a network node (e.g., base station) for determining a position of the wireless device in accordance with various aspects as described herein.

FIG. 10 illustrates one embodiment of a method 1000 by a network node (e.g., base station) for determining a position of a wireless device in accordance with various aspects as described herein. In FIG. 10, the method 1000 may start, for instance, at block 1001 where it may include receiving, from another network node (e.g., location server, base station), an indication of the set of one or more radio resources or the individual resources in the set. At block 1003, the method 1000 includes obtaining a set of one or more radio resources or individual resources in the set on which positioning measurements are to be performed by a group of cells on a device-unique reference signal transmitted by the wireless device. At block 1005, the method 1000 includes assigning the set or individual radio resources in the set to the wireless device. At block 1007, the method 1000 may include transmitting, to the wireless device, an indication of the set of one or more radio resources or the individual resources in the set. At block 1009, the method may include receiving, from the other network node, an indication of a configuration of the reference signal. At block 1011, the method 1000 may include determining a configuration of the reference signal unique to the wireless device based on the configuration of the reference signal. At block 1013, the method 1000 may include transmitting, to the wireless device, an indication of the configuration of the reference signal to be transmitted by the wireless device. At block 1015, the method 1000 may include receiving, from a cell of the network node, the device-unique reference signal transmitted by the wireless device. At block 1017, the method 1000 may include determining a position measurement of the wireless device based on the received reference signal. At block 1019, the method 1000 may include transmitting, to the other network node, an indication of the position of the position measurement.

Figure 11:
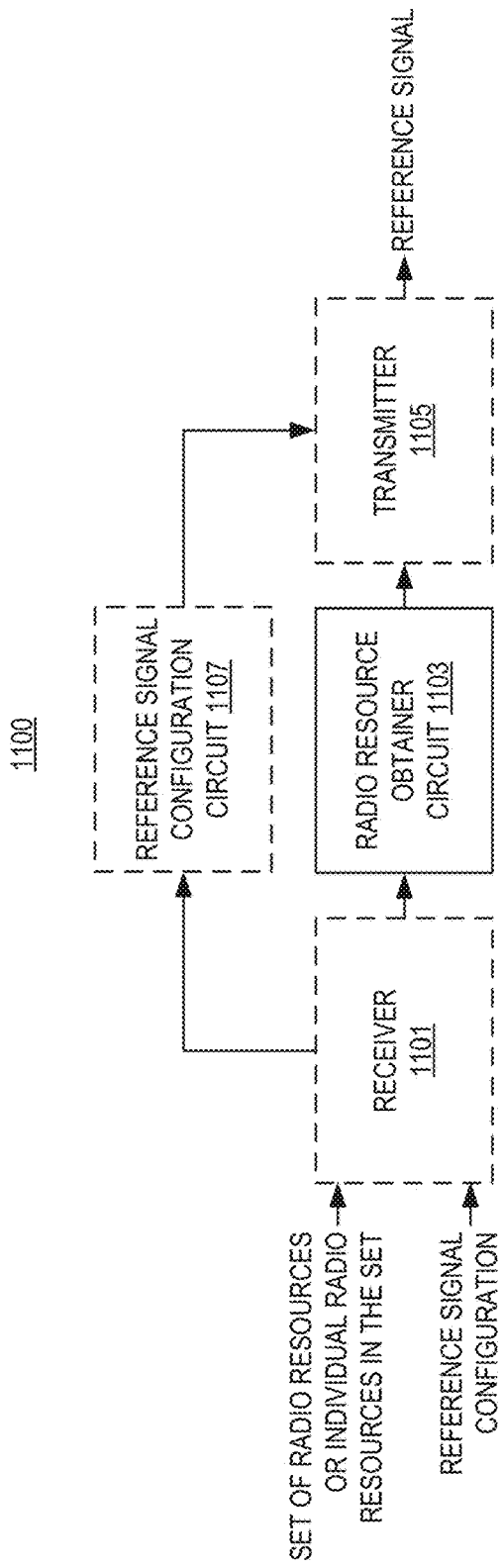
FIG. 11 illustrates one embodiment of a wireless device (e.g., UE) for determining a position of the wireless device in accordance with various aspects as described herein.

FIG. 11 illustrates one embodiment of a wireless device 1100 (e.g., UE) for determining a position of the wireless device in accordance with various aspects as described herein. In FIG. 11, the wireless device 1100 may include a receiver 1101, a radio resource obtainer circuit 1103, a transmitter circuit 1105, a reference signal configuration circuit 1107, the like, or any combination thereof. The receiver circuit 1101 may be configured to receive, from a network node, the set of one or more radio resources or the individual resources in the set. The receiver circuit 1101 may also be configured to receive, from a network node, an indication of a configuration of the reference signal to be transmitted by the wireless device. The reference signal configuration circuit 1107 may be configured to configure the reference signal based on the configuration. The radio resource obtainer circuit 1103 is configured to obtain a set of one or more radio resources or individual resources in the set on which positioning measurements are to be performed by a group of cells on a device-unique reference signal transmitted by the wireless device. Further, the transmitter circuit 1105 may be configured to transmit the reference signal on the set of one or more radio resources or the individual resources in the set.

Figure 12:
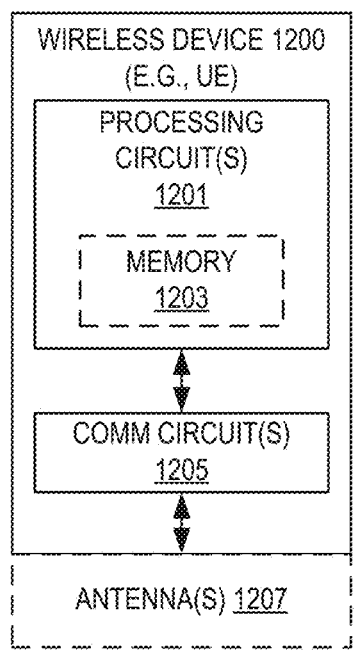
FIG. 12 illustrates another embodiment of a wireless device (e.g., UE) for determining a position of the wireless device in accordance with various aspects as described herein.

FIG. 12 illustrates another embodiment of a wireless device 1200 (e.g., UE) for determining a position of the wireless device in accordance with various aspects as described herein. In FIG. 12, the wireless device 1200 may include processing circuit(s) 1201, communications circuit(s) 1205, antenna(s) 1207, the like, or any combination thereof. The communication circuit(s) 1205 may be configured to transmit or receive information to or from one or more network nodes via any communication technology. This communication may occur using the one or more antennas 1207 that are either internal or external to the wireless device 1200. The processing circuit(s) 1201 may be configured to perform processing as described herein (e.g., the method of FIG. 14) such as by executing program instructions stored in memory 1203. The processing circuit(s) 1201 in this regard may implement certain functional means, units, or modules.

Figure 13:
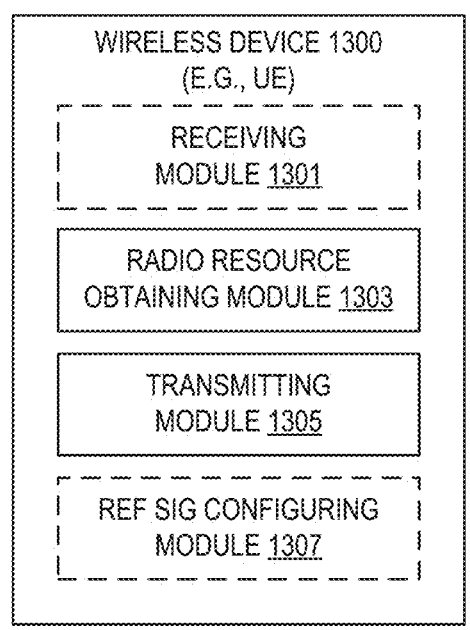
FIG. 13 illustrates one embodiment of a wireless device (e.g., UE) for determining a position of the wireless device in accordance with various aspects as described herein.

FIG. 13 illustrates one embodiment of a wireless device 1300 (e.g., UE) for determining a position of the wireless device in accordance with various aspects as described herein. In FIG. 13, the network node 1300 may implement various functional means, units, or modules (e.g., via the processing circuit(s) 1201 of FIG. 12 or via software). These functional means, units, or modules (e.g., for implementing the method of FIG. 14) may include a receiving module or unit 1301 for receiving, from a network node, the set of one or more radio resources or the individual resources in the set. Further, the receiving module or unit 1301 may include receiving, from a network node, an indication of a configuration of the reference signal to be transmitted by the wireless device. These functional means, units, or modules may include a reference signal configuring module or unit 1307 for configuring the reference signal based on the configuration. Also, these functional means, units, or modules include a radio resource obtaining module or unit 1303 for obtaining a set of one or more radio resources or individual resources in the set on which positioning measurements are to be performed by a group of cells on a device-unique reference signal transmitted by the wireless device. In addition, these functional means, units, or modules include a transmitting module or unit 1305 for transmitting the reference signal on the set of one or more radio resources or the individual resources in the set.

Figure 14:
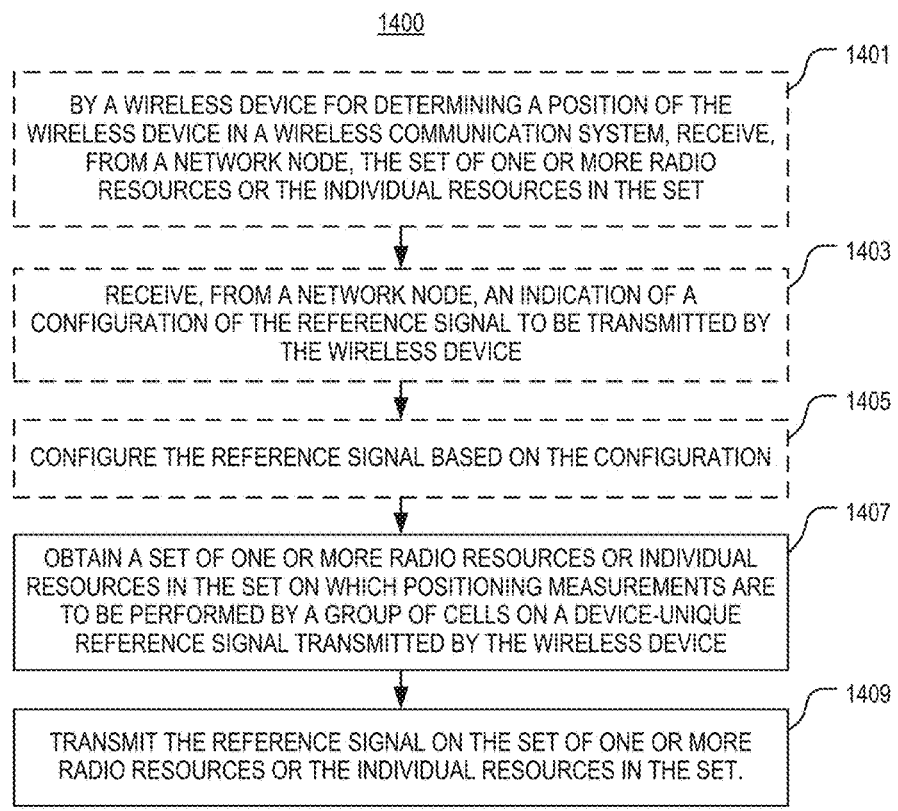
FIG. 14 illustrates one embodiment of a method by a wireless device (e.g., UE) for determining a position of the wireless device in accordance with various aspects as described herein.

FIG. 14 illustrates one embodiment of a method 1400 by a wireless device (e.g., UE) for determining a position of the wireless device in accordance with various aspects as described herein. In FIG. 14, the method 1400 may start, for instance, at block 1401 where it may include receiving, from a network node, the set of one or more radio resources or the individual resources in the set. At block 1403, the method 1400 may include receiving, from a network node, an indication of a configuration of the reference signal to be transmitted by the wireless device. At block 1405, the method 1400 may include configuring the reference signal based on the configuration. At block 1407, the method 1400 includes obtaining a set of one or more radio resources or individual resources in the set on which positioning measurements are to be performed by a group of cells on a device-unique reference signal transmitted by the wireless device. At block 1409, the method 1400 includes transmitting the reference signal on the set of one or more radio resources or the individual resources in the set.

Of course, despite particular applicability to NB-IoT in some examples and embodiments, it will be appreciated that the techniques described herein may be applied to other wireless networks, including enhanced Machine Type Communications (eMTC) as well as to successors of the Evolved Universal Terrestrial Radio Access Network (E-UTRAN). Thus, references herein to signals using terminology from the 3GPP standards for LTE should be understood to apply more generally to signals having similar characteristics and/or purposes in other networks.

A network node herein is any type of node (e.g., a base station, location server) capable of communicating with another node over a wired or wireless link. A wireless device is any type of radio node capable of communicating with a network node over a wireless link. A wireless device may therefore refer to a machine-to-machine (M2M) device, a machine-type communications (MTC) device, an NB-IoT device, or the like. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

Furthermore, in an NB-IoT context, it may be the case that, to support lower manufacturing costs for NB-IOT devices, the transmission bandwidth is reduced to one physical resource block (PRB) of size 180 kHz. Both frequency division duplexing (FDD) and TDD are supported. For FDD (i.e. the transmitter and receiver operate at different carrier frequencies) only half-duplex mode needs to be supported in the UE. The lower complexity of the devices (e.g. only one transmission/receiver chain) means that a small number of repetitions might be needed also in normal coverage. Further, to alleviate UE complexity, the working assumption may be to have cross-subframe scheduling. That is, a transmission is first scheduled on Enhanced Physical DL Control Channel (E-PDCCH aka M-EPDCCH) and then the first transmission of the actual data on the Physical DL Shared Channel (PDSCH) is carried out after the final transmission of the M-EPDCCH.

Figure 15:
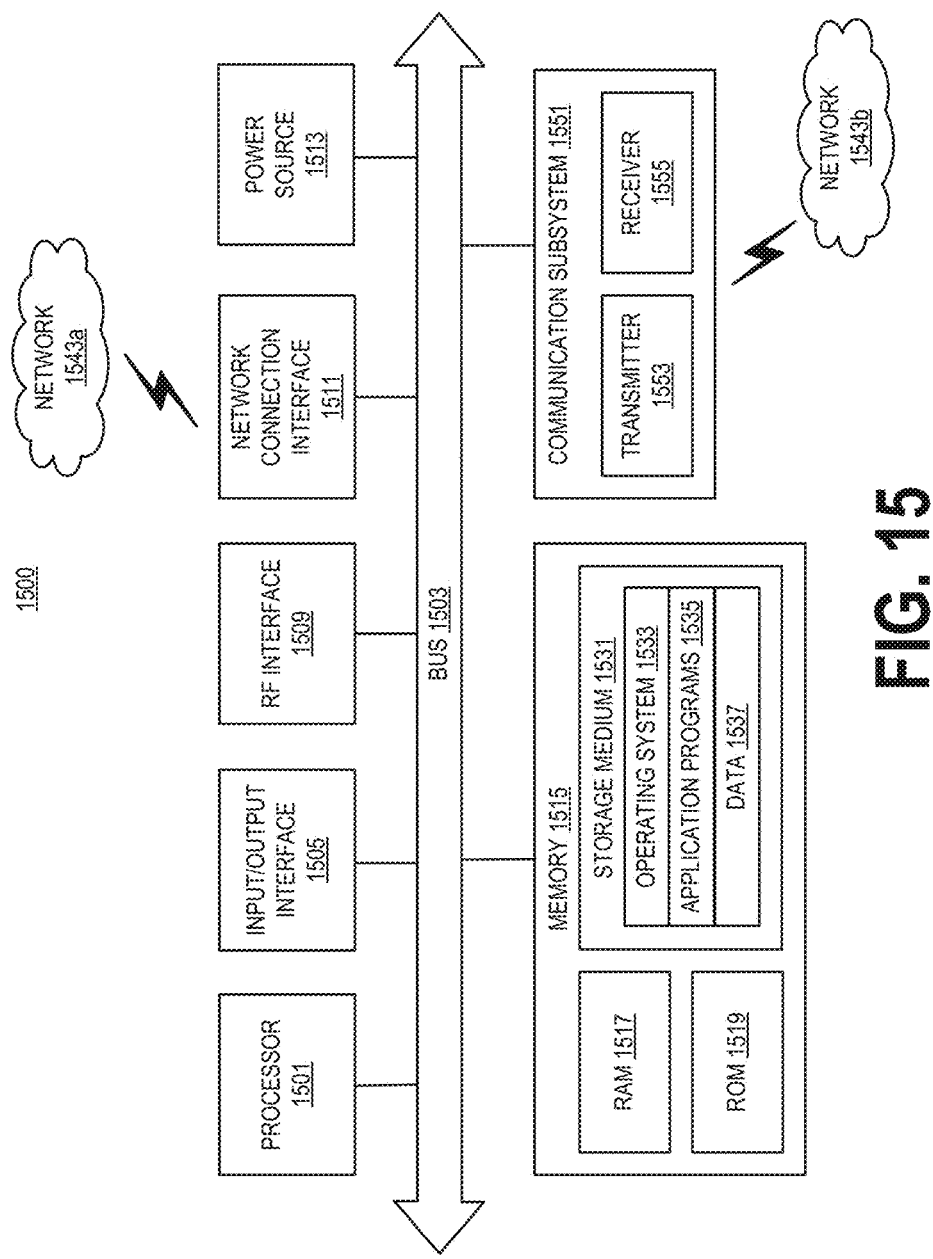
FIG. 15 illustrates another embodiment of a wireless device (e.g., UE) for determining a position of a wireless device in accordance with various aspects as described herein.

FIG. 15 illustrates another embodiment of a wireless device 1500 in accordance with various aspects as described herein. In some instances, the wireless device 1500 may be referred to as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 1500 may be a set of hardware components. In FIG. 15, the wireless device 1500 may be configured to include a processor 1501 that is operatively coupled to an input/output interface 1505, a radio frequency (RF) interface 1509, a network connection interface 1511, a memory 1515 including a random access memory (RAM) 1517, a read only memory (ROM) 1519, a storage medium 1531 or the like, a communication subsystem 1551, a power source 1533, another component, or any combination thereof. The storage medium 1531 may include an operating system 1533, an application program 1535, data 1537, or the like. Specific devices may utilize all of the components shown in FIG. 15, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 15, the processor 1501 may be configured to process computer instructions and data. The processor 1501 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1501 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1505 may be configured to provide a communication interface to an input device, output device, or input and output device. The wireless device 1500 may be configured to use an output device via the input/output interface 1505. A person of ordinary skill will recognize that an output device may use the same type of interface port as an input device. For example, a USB port may be used to provide input to and output from the wireless device 1500. The output device may be a speaker, a sound card, a video card, a display, a monitor, a printer, an actuator, an emitter, a smartcard, another output device, or any combination thereof. The wireless device 1500 may be configured to use an input device via the input/output interface 1505 to allow a user to capture information into the wireless device 1500. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, the RF interface 1509 may be configured to provide a communication interface to RF components such as a transmitter, a receiver, and an antenna. The network connection interface 1511 may be configured to provide a communication interface to a network 1543a. The network 1543a may encompass wired and wireless communication networks such as a local-area network (LAN), a wide-area network (WAN), a computer network, a wireless network, a telecommunications network, another like network or any combination thereof. For example, the network 1543a may be a Wi-Fi network. The network connection interface 1511 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1511 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1517 may be configured to interface via the bus 1503 to the processor 1501 to provide storage or caching of data or computer instructions during the execution of software programs such as the operating system, application programs, and device drivers. In one example, the wireless device 1500 may include at least one hundred and twenty-eight megabytes (128 Mbytes) of RAM. The ROM 1519 may be configured to provide computer instructions or data to the processor 1501. For example, the ROM 1519 may be configured to be invariant low-level system code or data for basic system functions such as basic input and output (I/O), startup, or reception of keystrokes from a keyboard that are stored in a non-volatile memory. The storage medium 1531 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1531 may be configured to include an operating system 1533, an application program 1535 such as a web browser application, a widget or gadget engine or another application, and a data file 1537.

In FIG. 15, the processor 1501 may be configured to communicate with a network 1543b using the communication subsystem 1551. The network 1543a and the network 1543b may be the same network or networks or different network or networks. The communication subsystem 1551 may be configured to include one or more transceivers used to communicate with the network 1543b. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMax, NB-IoT, or the like.

In another example, the communication subsystem 1551 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMax, NB-IoT, or the like. Each transceiver may include a transmitter 1553 or a receiver 1555 to implement transmitter or receiver functionality, respectively, appropriate to the RAN links (e.g., frequency allocations and the like). Further, the transmitter 1553 and the receiver 1555 of each transceiver may share circuit components, software or firmware, or alternatively may be implemented separately.

In the current embodiment, the communication functions of the communication subsystem 1551 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1551 may include cellular communication, Wi-Fi communication, Bluetooth communication, and GPS communication. The network 1543b may encompass wired and wireless communication networks such as a local-area network (LAN), a wide-area network (WAN), a computer network, a wireless network, a telecommunications network, another like network or any combination thereof. For example, the network 1543b may be a cellular network, a Wi-Fi network, and a near-field network. The power source 1513 may be configured to provide an alternating current (AC) or direct current (DC) power to components of the wireless device 1500.

In FIG. 15, the storage medium 1531 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1531 may allow the wireless device 1500 to access computer-executable instructions, application programs or the like, stored on transitory or non-transitory memory media, to off-load data, or to upload data. An article of manufacture, such as one utilizing a communication system may be tangibly embodied in storage medium 1531, which may comprise a computer-readable medium.

The functionality of the methods described herein may be implemented in one of the components of the wireless device 1500 or partitioned across multiple components of the wireless device 1500. Further, the functionality of the methods described herein may be implemented in any combination of hardware, software, or firmware. In one example, the communication subsystem 1551 may be configured to include any of the components described herein. Further, the processor 1501 may be configured to communicate with any of such components over the bus 1503. In another example, any of such components may be represented by program instructions stored in memory that when executed by the processor 1501 performs the corresponding functions described herein. In another example, the functionality of any of such components may be partitioned between the processor 1501 and the communication subsystem 1551. In another example, the non-computative-intensive functions of any of such components may be implemented in software or firmware and the computative-intensive functions may be implemented in hardware.

This disclosure also describes how existing signals in 3GPP Release 13 (e.g., Narrowband Internet of Things Physical Random Access Channel (NPRACH)-like signal) can be used to enable uplink-based positioning for NB-IoT. In particular, this disclosure also describes how the network can flexibly configure uplink resources for positioning in NB-IoT. An NPRACH-like signal can also be used to uniquely identify the UE and thereby minimize the message transfer associated with a positioning attempt. The following description is related to NPRACH-like reference signal based UL positioning. However, the concepts can nevertheless be extended to apply to other cases including multi-tone reference signals and/or single tone and multi-tone transmissions.

Figure 16:
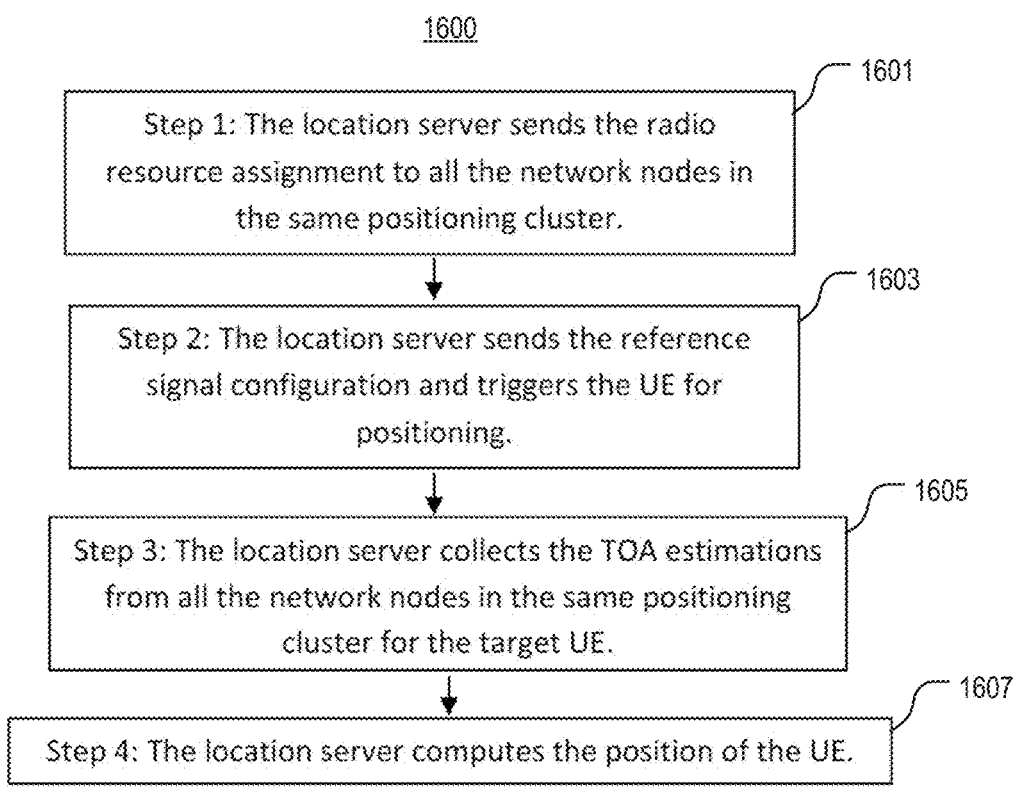
FIG. 16 illustrates another embodiment of a method by a network node (e.g., location server, base station) for determining a position of a wireless device in accordance with various aspects as described herein.

FIG. 16 illustrates another embodiment of a method 1600 by a network node (e.g., a location server such as an E-SMLC, a base station such as an eNodeB, or the like) for determining a position of a wireless device in accordance with various aspects as described herein. In FIG. 16, the method 1600 may start, for instance, at block 1601 where it may include sending the radio resource assignment to all of the network nodes in the same positioning cluster. At block 1603, the method 1600 may include sending the reference signal configuration and triggering the wireless device for positioning. At block 1605, the method 1600 may include collecting TOA estimations from all of the network nodes in the same positioning cluster for the wireless device. At block 1607, the method 1600 may include determining the position of the UE based on the collected TOA estimations.

Figure 17:
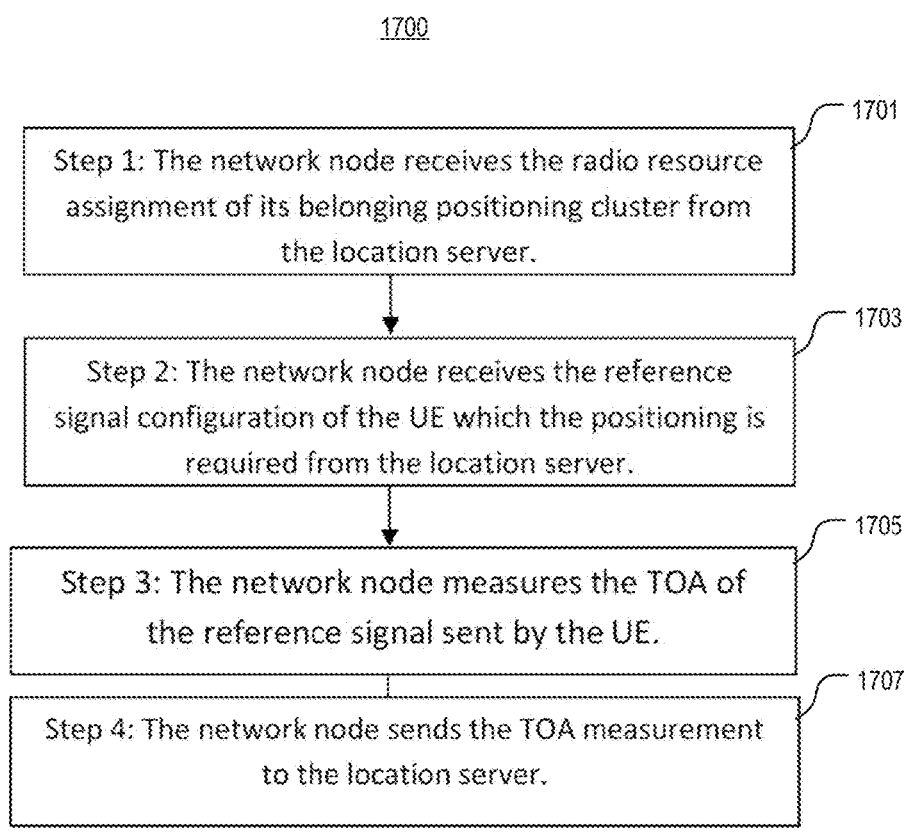
FIG. 17 illustrates another embodiment of a method by a network node (e.g., base station) for determining a position of a wireless device in accordance with various aspects as described herein.

FIG. 17 illustrates another embodiment of a method 1700 by a network node (e.g., base station) for determining a position of a wireless device in accordance with various aspects as described herein. In FIG. 17, the method 1700 may start, for instance, at block 1701 where it may include receiving the radio resource assignment for its assigned positioning cluster from another network node (e.g., location server, base station). At block 1703, the method 1700 may include receiving the reference signal configuration of the wireless device, which the positioning is required from the other network node. At block 1705, the method 1700 may include measuring the TOA of the reference signal transmitted by the wireless device. At block 1707, the method 1700 may include sending the TOA measurement to the other network node.

Figure 18:
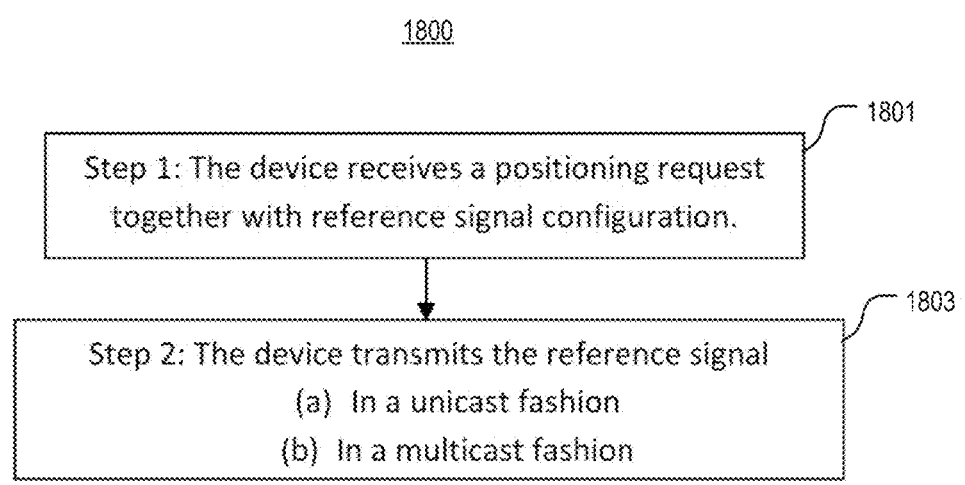
FIG. 18 illustrates another embodiment of a method by a wireless device (e.g., UE) for determining a position of a wireless device in accordance with various aspects as described herein.

FIG. 18 illustrates another embodiment of a method 1800 by a wireless device (e.g., UE) for determining a position of a wireless device in accordance with various aspects as described herein. In FIG. 18, the method 1800 start, for instance, at block 1801 where it may include receiving a positioning request and a reference signal configuration. At block 1803, the method 1800 may include transmitting the reference signal such as a unicast or multicast transmission.

With the leanest design of uplink-based positioning, one of the tasks and possibly the only task on the UE side is to receive the positioning request and in response, generate and transmit the reference signal. This imposes minimal computational effort on the UE and helps to achieve ultra-low cost of NB-IoT UEs. Further, compared to downlink (DL) TDOA, better time of arrival estimates may be obtained at the eNBs since it is possible to use more advanced signal detection algorithms at the eNBs.

Use of an NPRACH-like single tone signal limits the impact on the NB-IoT system design while maximizing coverage. It also enables positioning of a device without the use of an LMU. An NPRACH-like signal can also be used to uniquely identify the UE and thereby minimize the message transfer associated with a positioning attempt. However, as previously mentioned, the techniques described herein are not restricted to an NPRACH-like signal and can be extended to apply to other cases including a multi-tone reference signal or a single tone or multi-tone transmission.

To enable uplink-based positioning for NB-IoT, a new reference signal may be defined. In LTE, the reference signal is the sounding reference signal (SRS), which is not available in NB-IoT. To limit the impact on the NB-IoT design, an existing signal such as in 3GPP Release 13 (e.g., NPRACH-like signal) may facilitate TOA estimation by the eNB with sufficient positioning accuracy. An NPRACH-like signal may also be used to uniquely identify the UE and thereby minimize the message transfer associated with a positioning attempt. For uplink-based positioning, a set of eNBs may receive a reference signal unique to the targeted UE and may perform the TOA estimates based on the received reference signal. The UE may send the reference signal as a unicast or multicast transmission.

For the reception of the reference signal, a common time and frequency synchronized radio resource may need to be configured in all cells taking part in a positioning attempt. This implies that an NB-IoT carrier may need to be reused in all cells and that common radio NPRACH resource may be configured on that NB-IoT carrier. To allow positioning via a single NPRACH attempt, a unique NPRACH preamble may be assigned to a UE. This preamble may allow each participating eNB to identify the UE. The uniqueness of the preamble may lie within the starting subcarrier used by the NPRACH hopping pattern, within the NPRACH hopping pattern, within the waveform sent, or within a combination thereof.

In one embodiment, the UE performs a unicast transmission of a reference signal (e.g., NPRACH-like signal) to each eNB of a set of targeted eNBs. For instance, the positioning server may trigger the positioning and may command the UE to transmit the reference signal in a set of cells. The positioning server may either explicitly direct the UE to a set of cells or the UE may autonomously select the cells (e.g., based on a metric corresponding to the experienced signal quality such as estimated signal strength or signal to interference and noise ratio (SINR)). Alternatively or additionally, the UE may transmit the reference signals based on the configurations provided by the serving eNB without knowing which cells need to receive these signals. In each eNB, a dedicated radio resource may be configured to receive the reference signal. The resource configurations associated with the eNBs may be provided via the system information in each cell, dedicated signaling with the serving eNB, or both. The UE may transmit separate instances of the reference signal in each cell. Each transmission may be optimized in terms of used power and number of repetitions for the radio environment experienced for the UE to eNB link. Advantages of this unicasting technique may include lower coordination of radio resource across eNBs and the optimized transmissions of the reference signal in terms of power and number of repetitions. Disadvantages may include the inefficient use of radio resources and higher positioning latency.

In another embodiment, the UE performs a multicast transmission of a single reference signal (e.g., NPRACH-like signal) to a set of targeted eNBs. For instance, the positioning server may trigger the positioning and may command the UE to transmit the reference signal. The list of eNBs attempting to receive the reference signal may be configured by the positioning server, and may be signaled to the UE or may remain transparent to the UE. In each eNB, a dedicated radio resource may be configured to receive the reference signal. The resource may need to be overlapping in time and frequency across the involved eNBs. The UE may transmit a single reference signal, which in its simplest form may use a high number of repetitions or full power to ensure that the signal is received by a multitude of eNBs. The UE may also optimize the used power or the number of repetitions based on a metric corresponding to the experienced signal quality such as an estimated signal strength or signal to interference and noise ratio (SINR) measured between the UE and a set of eNBs in the vicinity of the UE. Advantages of this multicasting technique may include more efficient use of radio resource as the reference signal is sent simultaneously to all selected eNBs, lower UE power consumption as reference signal transmission is done more quickly. Disadvantages may include a higher coordination of radio resource across eNBs and potentially higher signal level exposure at the serving eNB.

Figure 19:
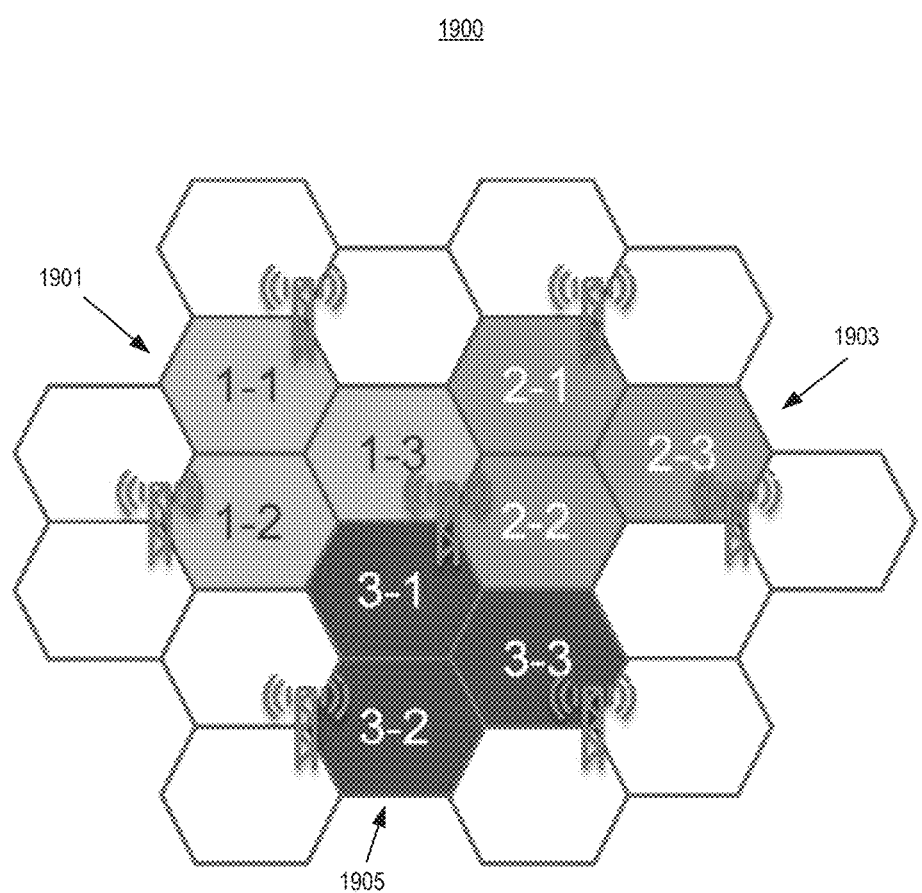
FIG. 19 illustrates one embodiment of a positioning cluster arrangement in accordance with various aspects as described herein.

Next we describe how to configure the common radio resource and preamble assignment to facilitate uplink-based positioning in NB-IoT. In one definition, a positioning cluster is a coordination of radio resource across base stations (e.g., eNBs). The concept of a positioning cluster is to address issues such as limited available radio resources. FIG. 19 illustrates one embodiment of a positioning cluster arrangement 1900 in accordance with various aspects as described herein. In FIG. 19, a first positioning cluster 1901 includes cells 1-1, 1-2, 1-3, a second positioning cluster 1903 includes cells 2-1, 2-2, 2-3, and a third positioning cluster 1905 includes cells 3-1, 3-2, 3-3.

Figure 20:
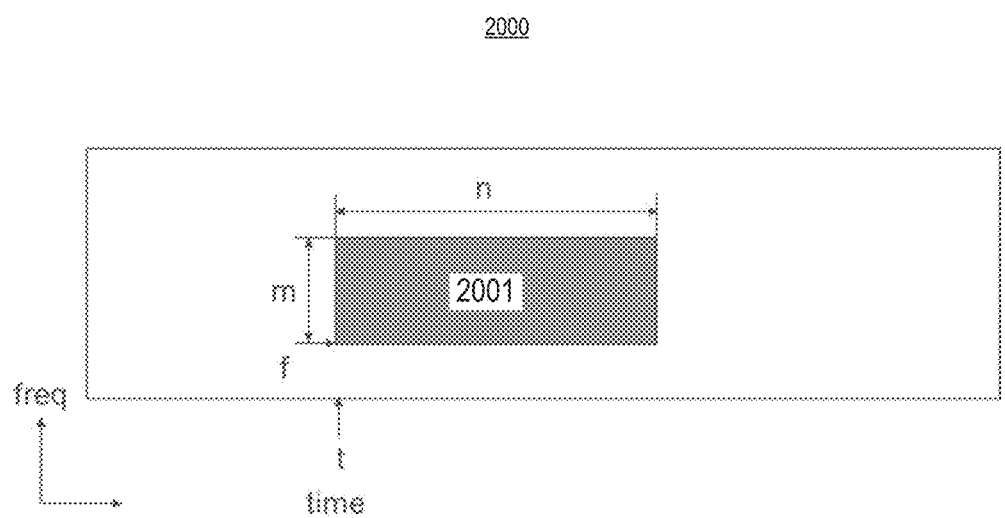
FIG. 20 illustrates one embodiment of a common resource configuration in accordance with various aspects as described herein.

In one embodiment, a common radio resource is configured to receive the reference signal transmitted from the UE for each positioning cluster. FIG. 20 illustrates one embodiment of a common resource configuration 2000 having one radio resource 2001 in accordance with various aspects as described herein. In FIG. 20, the common resource configuration 2000 for the radio resource 2001 includes configuration parameters. These configuration parameters may include a starting time (t), a starting frequency (f), a frequency width (m), a time duration (n), an identifier (ID), the like, or any combination thereof. The starting time (t) may be determined in terms of frame and subframe indices. The frequency width (m) may be determined in terms of an index of a subcarrier of a certain bandwidth. The frequency width (m) may be determined in terms of number of subcarriers with some subcarrier spacing. The time duration (n) may be determined in terms of reference signal length. The interval (i) represents reoccurrence in time of the radio resource. The identifier (ID) may be optional depending on the reference signal design. For example, if an NPRACH-like reference signal is used, an identifier (ID) is needed such as to determine the frequency hopping pattern of NPRACH.

Figure 21:
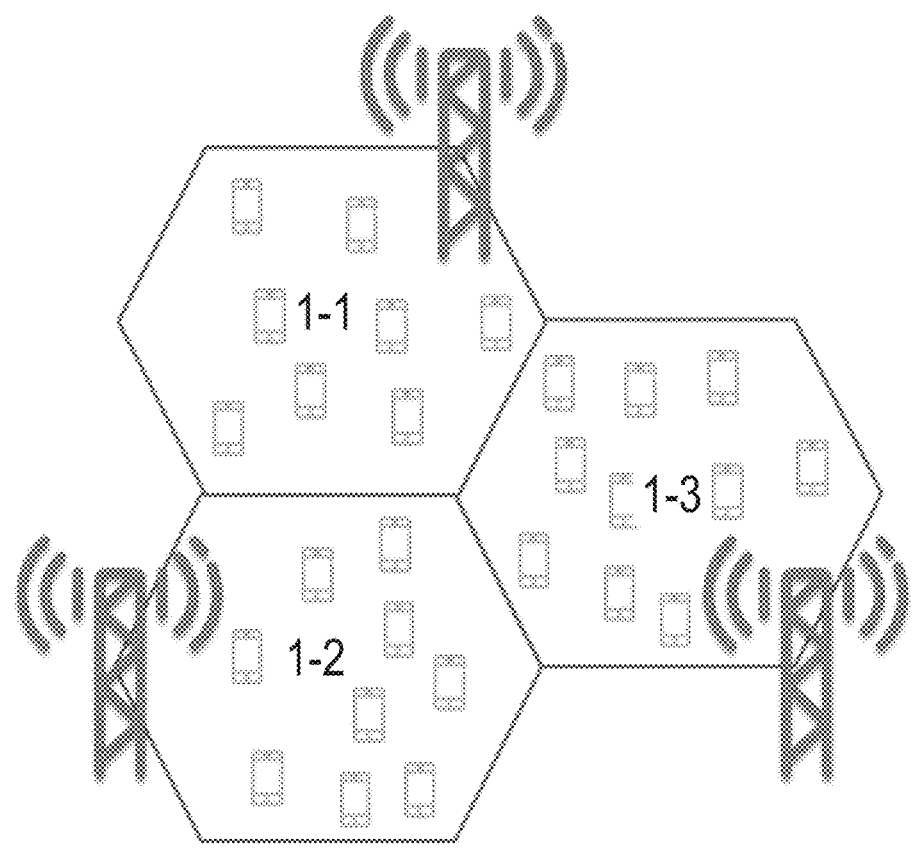
FIG. 21 illustrates one embodiment of preamble assignment in a positioning cluster in accordance with various aspects as described herein.

In this embodiment, with the configured radio resource 2001 in a positioning cluster, the network may assign a unique reference signal to each targeted UE. For example, with thirty-six tones (i.e., subcarriers) configured for NPRACH-like reference signals in a positioning cluster, thirty-six unique reference signals are available. The network may assign (e.g., simultaneous assignment) and command up to thirty-six UEs in the positioning cluster to transmit reference signals. FIG. 21 illustrates a positioning cluster 2100 having preamble assignments for cells 1-1, 1-2, 1-3. In FIG. 21, preamble assignments are made for 8, 9, and 10 UEs in respective cells 1-1, 1-2, and 1-3. While FIG. 20 only shows one configuration 2000 for the radio resource 2001 on a time-frequency resource grid, each positioning cluster may configure more than one radio resource or a radio resource reoccurring in time. Further, the configuration parameters and preamble assignment for different radio resources may be different. Also, the network may command the targeted UEs to transmit reference signals in some or all of these resources. With multiple transmissions, the network may obtain more accurate TOA estimates.

Figure 22:
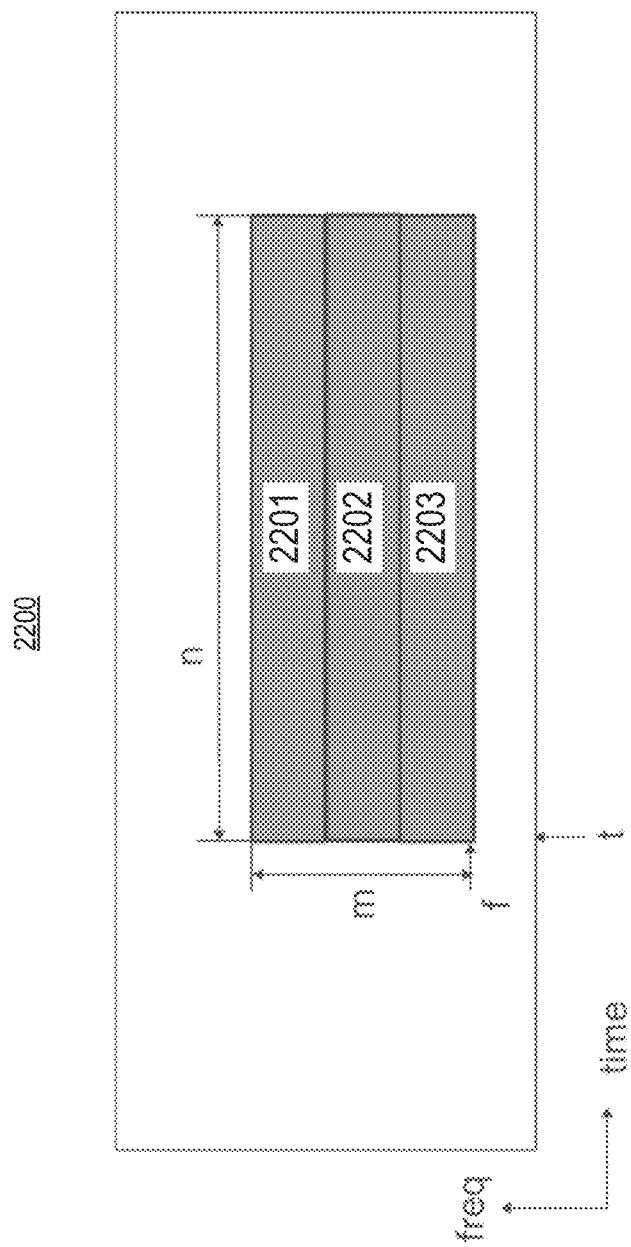
FIG. 22 illustrates one embodiment of separate resource configuration for each cell in a positioning cluster in accordance with various aspects as described herein.

In another embodiment, a common radio resource is configured, and reference signals and a preamble assignment are coordinated across all eNBs in the same positioning cluster. For instance, each cell in a positioning cluster may assign its own resources from the common radio resource pool for targeted UEs in its coverage. As such, the assignment parameters may be different across the cells belonging to the same positioning cluster. The allowed assignments may however be known to all cells in the same positioning cluster, and may be limited to the common radio resource pool so that all eNBs in the same positioning cluster can measure TOA estimates in all configured resources in the positioning cluster. FIG. 22 illustrates one example of a separate resource configuration 2200 for each cell 1-1, 1-2, 1-3 in a positioning cluster. In FIG. 22, each cell 1-1, 1-2, 1-3 in the same positioning cluster 2101 may be assigned its own respective radio resource 2201, 2202, 2203 for its UEs. For instance, for twelve tones configured for NPRACH-like reference signals in each cell 1-1, 1-2, 1-3 in the positioning cluster 2101, twelve unique reference signals are available for each cell 1-1, 1-2, 1-3. The network may simultaneously assign and command up to twelve UEs in a cell 1-1, 1-2, 1-3 in the positioning cluster 2100 to transmit reference signals. As previously mentioned, FIG. 21 shows one example of eight, nine, and ten targeted UEs in respective cells 1-1, 1-2, 1-3 in the positioning cluster 2101. Any cell 1-1, 1-2, 1-3 in the positioning cluster 2101 may monitor all three resources 2201, 2202, 2203 and may perform TOA estimates accordingly.

Figure 23:
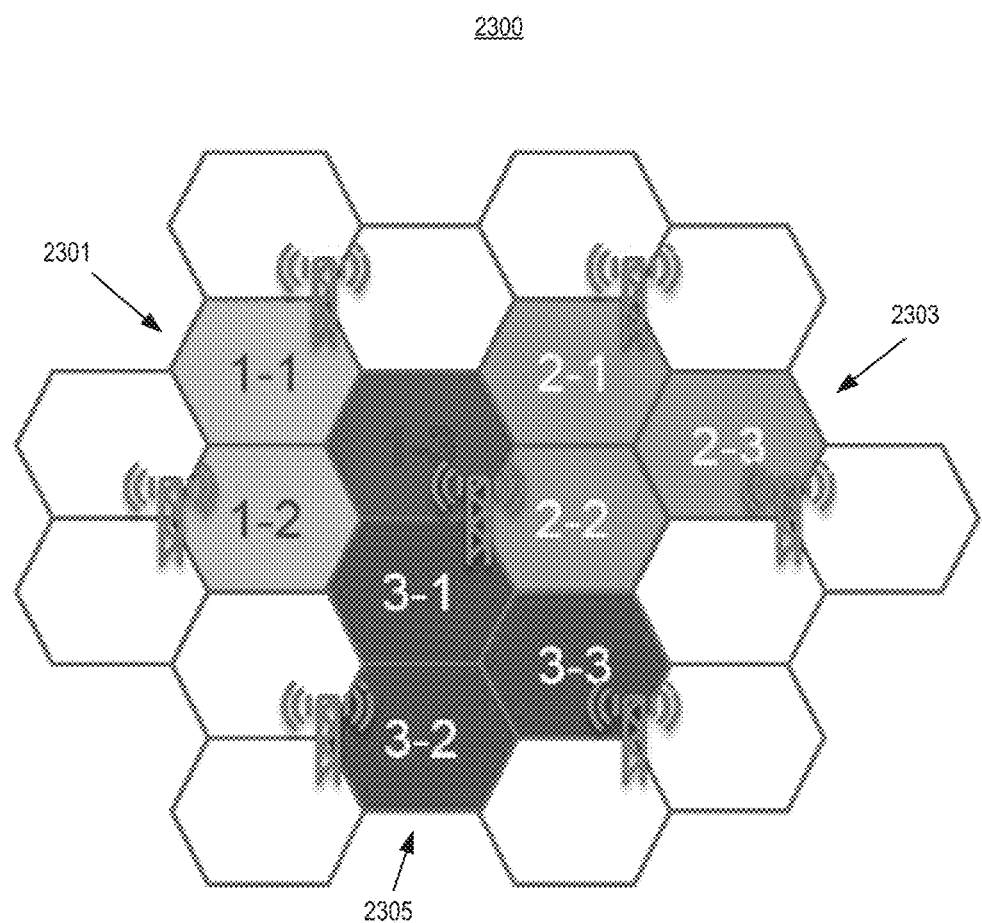
FIG. 23 illustrates one embodiment of an overlapping positioning cluster arrangement in accordance with various aspects as described herein.

In another embodiment, a cell belongs to more than one positioning cluster. For instance, FIG. 23 illustrates one embodiment of an overlapping positioning cluster arrangement 2300 in accordance with various aspects as described herein. In FIG. 23, the network may assign cells 1-1, 1-2, 1-3 to a first positioning cluster 2301, cells 1-3, 2-1, 2-2, 2-3 to a second positioning cluster 2303, and cells 3-1, 3-2, 3-3 to a third positioning cluster 2305. As such, the cell 1-3 is assigned to two different positioning clusters 2301, 2303. As in FIG. 20, the network may configure a common radio resource 2001 for positioning the first cluster 2301 at a first time (t1), and for positioning the second cluster 2303 at a second time (t2). Further, UEs in the cell 1-3 may transmit at both the first time (t1) and the second time (t2) since those UEs belong to the cell 1-3 in two different positioning clusters 2301, 2303. This configuration 2300 may result in twice as many measurements being available for UEs in the cell 1-3 at the cost of twice as many transmissions. For instance, with thirty-six tones (e.g., sub-carriers) configured for NPRACH-like reference signals in each positioning cluster 2301, 2303, 2305, thirty-six unique reference signals are available. The network may assign (e.g., simultaneous assignment) and command up to thirty-six UEs in a positioning cluster 2301, 2303, 2305 to transmit reference signals. In the first positioning cluster 2301, the thirty-six unique reference signals are shared among UEs in three cells 1-1, 1-2, 1-3, while in the second positioning cluster 2303, the thirty-six unique reference signals are shared among UEs in four cells 1-3, 2-1, 2-2, 2-3.

Figure 24:
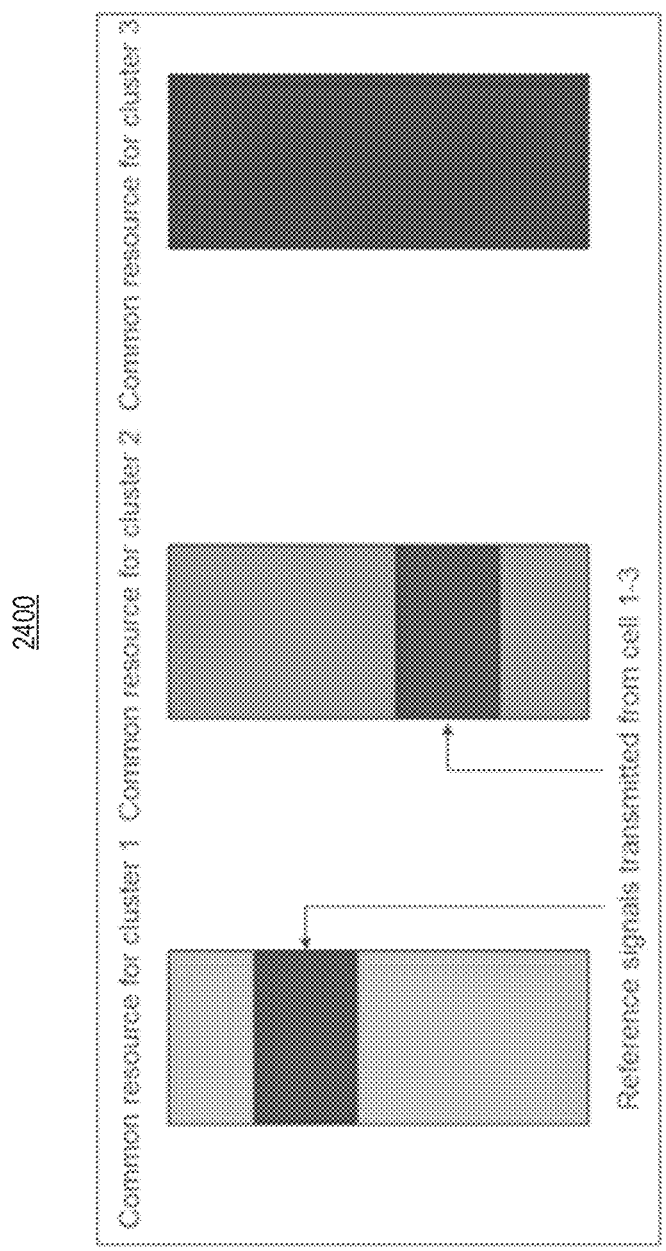
FIG. 24 illustrates one embodiment of a common resource configuration for overlapping positioning clusters in accordance with various aspects as described herein.
Figure 25:
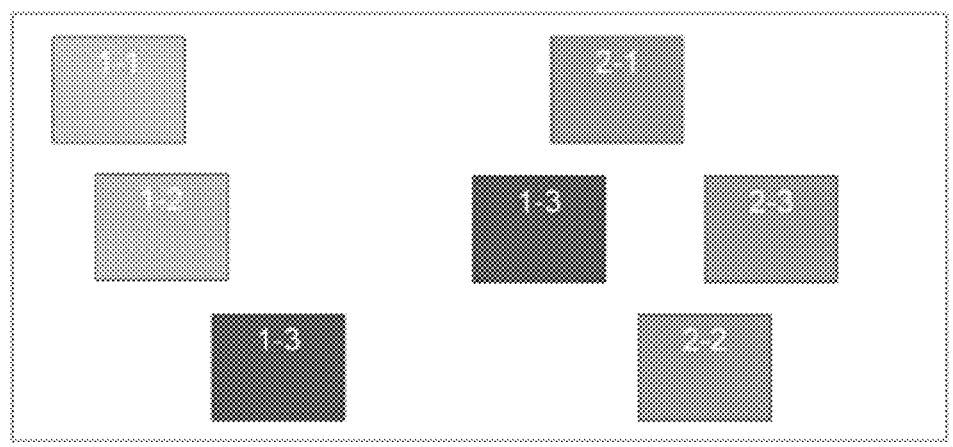
FIG. 25 illustrates one embodiment of separate resource configuration for each cell for overlapping positioning clusters in accordance with various aspects as described herein.

In another embodiment, a common radio resource is configured for overlapping positioning clusters. As shown in FIG. 24, each cell in a positioning cluster may assign its own resource for targeted UEs in its coverage area. Hence, the assignments may be different across the cells of the same positioning cluster. However, the allowed assigned resources may be known to all cells in the same positioning cluster so that all the eNBs in the same positioning cluster may measure TOA estimates in all configured resources in the positioning cluster. As shown in FIGS. 23 and 25, the network may make an assignment of cells 1-1, 1-2, 1-3 to the first positioning cluster 2301, and cells 1-3, 2-1, 2-2, 2-3 to the second positioning cluster 2303. As such, cell 1-3 belongs to two positioning clusters 2301, 2303. Twelve tones may be configured for NPRACH-like reference signals in each cell in each positioning cluster 2301, 2303. The cell 1-3 belongs to two positioning clusters 2301, 2303 and configures two resources. The network may assign (e.g., simultaneous assignment) and command up to twelve UEs in a cell in each positioning cluster 2301, 2303 to transmit reference signals. Thus, UEs in the cell 1-3 may transmit twice since two resources are configured.

As previously described, the basic concept of UL TDOA is that a positioning server (e.g., E-SMLC) requests the serving eNB to configure the UE with an UL signal). The eNB provides configuration details back to E-SMLC, which distributes the information to a set of Location Measurement Units (LMUs) (e.g., logical node which may be implemented in an eNB or deployed as a standalone unit). When the uplink signal has been transmitted, TOA is estimated at the LMUs and reported to the E-SLMC where the UE position is estimated. For LTE, UTDOA was introduced in 3GPP Release 11 and uses the Sounding Reference Signal (SRS) as a reference signal.

To enable UL TDOA for NB-IoT, a new reference signal needs to be defined. As mentioned, the reference signal for LTE is the sounding reference signal (SRS), which is not available in NB-IoT. To limit the impact on the NB-IoT design, it is desirable to examine existing signals in 3GPP Release 13 (e.g., a NPRACH-like signal) that facilitates TOA estimation by the eNB with sufficient accuracy. An NPRACH-like signal may also be used to uniquely identify the UE and thereby minimize the message transfer associated with a positioning attempt. Accordingly, the following embodiment is related to UL TDOA based on a NPRACH-like reference signal.

In one embodiment, a method of supporting UL TDOA for NB-IoT is provided. A positioning server may trigger a positioning attempt and may command a UE to transmit the reference signal. In each eNB that performs the positioning attempt, a dedicated radio resource may be configured for the reception of the reference signal. This resource may be overlapping and synchronized in time and frequency across the involved eNBs. Further, the list of eNBs receiving the reference signal may be transparent to the UE. The UE may then transmit a single reference signal, which in its simplest form may use a high number of repetitions or full power to secure that the signal is received by a multitude of eNBs. This approach may require tight coordination of radio resource across eNBs to facilitate UL TDOA positioning and may expose the serving eNB to high signal levels and the well-known near far problem. However, it may be efficient in terms of radio resource usage since the reference signal is sent a single time. The single transmission of the reference signal is also expected to have small impact on the UE power consumption. The eNBs taking part in a positioning attempt may be based on the geographical position of the eNBs (e.g., based on geometry, signal level, the like, or any combination thereof).

In this embodiment, to estimate the accuracy of the UL TDOA method, a simulator as described by 3GPP TDoc R1-167424, entitled "New simulator for positioning of NB-IoT" was used to run a set of simulations. The simulator was configured in accordance with the assumptions described in 3GPP TDoc R1-167423, entitled "On requirements and assumptions for positioning of NB-IoT," with Table 1 below highlighting a few selected assumptions from this reference.

TABLE 1

System simulation assumptions

| Assumption | Comments |
|---|---|
| TOA error model | Based on NPRACH; See 3GPP TDoc R1-167424 |
| Propagation condition | TU 1 Hz, EPA 1 Hz |
| Max number of eNBs per positioning attempt | 5, 10, 15, 20 |
| Minimum number of eNBs required in a positioning attempt | 4 |
| Mechanism to select eNBs in a positioning attempt | eNBs based on signal strength (SS) eNBs based on geometry (geographical location relative serving cell) |
| eNB output power | 43 dBm (standalone mode of operation) Note: NPRACH TOA error model is independent of DL SINR so the results presented apply equally well to inband and guardband operation. |
| UE output power | 23 dBm |
| UE mobility | 0 km/h |
| NW synchronization | Yes (Assumed to be perfect) |
| Frequency reuse | 1/1 reuse required |

Figure 26:
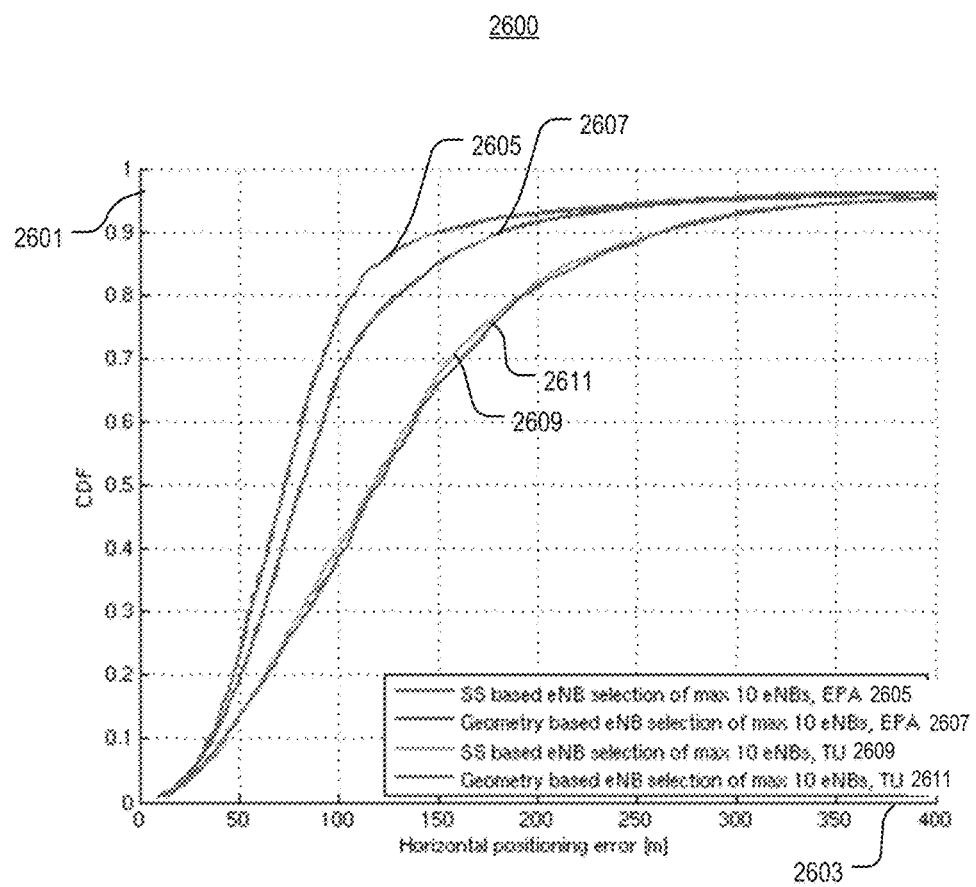
FIG. 26 is a graph of horizontal positioning error distribution for the UL TDOA positioning method described herein.

FIG. 26 is a graph 2600 of horizontal positioning error distribution for the UL TDOA positioning method described herein. In FIG. 26, the ordinate axis 2601 represents a cumulative distribution function (CDF) of the horizontal positioning error and the abscissas axis 2603 represents the horizontal error in meters. The results are represented by curves 2605, 2607, 2609, 2611. The curves 2605, 2609 represent signal strength-based selection of a maximum of ten eNBs using respective Extended Pedestrian A (EPA) channel model and a Typical Urban (TU) type of environment. The curves 2607, 2611 represent geometry-based selection of a maximum of ten eNBs using the respective EPA channel model and TU type of environment. These results show that a positioning accuracy of about eighty-five meters to one hundred meters may be achieved at the sixty-seventh percentile by UL TDOA based on the NPRACH-like reference signal if up to ten eNBs are involved in the positioning attempt and the propagation conditions correspond to the EPA channel model. With a TU type of environment the accuracy is reduced to around one hundred and fifty meters at the sixty-seventh percentile. It can also be noted that when up to ten eNBs are involved in the positioning attempt the signal strength selection of eNBs performs slightly better than the geometry based selection.

Tables 2 and 3 below summarizes results that reflect up to a maximum of twenty eNBs, where the horizontal accuracy achievable at the sixty-seventh percentile and the ninety-fifth percentile are presented. It should be noted that the results achievable are dependent on the maximum number of eNBs involved in the positioning procedure of a UE. When only five eNBs are considered, the geometry-based selection of eNBs is slightly more robust than the signal strength-based selection of eNBs.

TABLE 2

Horizontal accuracy achievable at the 67$^{th}$ and 95$^{th}$ percentile for EPA propagation.

| | Accuracy at 67$^{th}$/95$^{th}$ percentile [m] | |
|---|---|---|
| Max number of eNBs | SS based eNB selection | Geometry based eNB selection |
| 5 eNBs | 124/1257 | 133/813 |
| 10 eNBs | 88/269 | 99/192 |
| 15 eNBs | 83/295 | 95/296 |
| 20 eNBs | 81/197 | 90/198 |

TABLE 3

Horizontal accuracy achievable at the 67$^{th}$ and 95$^{th}$ percentile for TU propagation.

| | Accuracy at 67$^{th}$/95$^{th}$ percentile [m] | |
|---|---|---|
| Max number of eNBs | SS based eNB selection | Geometry based eNB selection |
| 5 eNBs | 227/1379 | 197/902 |
| 10 eNBs | 149/381 | 153/370 |
| 15 eNBs | 139/374 | 143/374 |
| 20 eNBs | 129/304 | 130/290 |

Of interest is also the likelihood that an eNB cannot estimate the TOA from four or more cells, which may be needed to complete the presented UL TDOA procedure. In the above investigated network setup, the likelihood of an eNB not being able to measure four or more cells due to a coupling loss exceeding one hundred and sixty-four dB is about 2.5%.

Most of the tasks and complexity involved in the NB-IoT UL TDOA procedure elaborated upon in this disclosure are located at the network side. The impact on the UE implementation is minimal. The only tasks related to this procedure on the UE side is to receive the UL signal configuration and to transmit the UL signal. This imposes minimal computational effort on the UE and helps achieve ultra-low cost of NB-IoT UEs. Further, compared to DL TDOA, more accurate time of arrival estimates may be obtained at the eNBs since it is possible to use more advanced signal detection algorithms at the eNBs. Accordingly, UL TDOA may correspond to reduced computational effort on the UE. Further, UL TOA estimation of the eNB may take advantage of advanced signal detection algorithms.

Since the serving eNB that initiates the positioning procedure does not possess any information concerning the radio link between the UE and neighboring eNBs, it has in this disclosure been assumed that the UE needs to use multiple repetitions (e.g., 32 repetitions) and full output power to maximize the likelihood of successful positioning. This may increase UE power consumption. It may also create near-far problems at the eNB. As such, interference aspects may be critical to UL TDOA performance.

For the reception of the reference signal, a common radio resource (e.g., synchronized in time and frequency) may be configured in all cells taking part in a positioning attempt. This implies that one NB-IoT carrier may need to be re-used in all cells and that a common radio NPRACH resource may be configured on that NB-IoT carrier (e.g., anchor or non-anchor carrier).

In order to achieve a good accuracy by UL TDOA, the network may need to be time synchronized or at least have a common and controlled reference time. However, this may not be the case for NB-IoT standalone deployment, where a GSM re-farming scenario is targeted. This may also not be the case for in-band/guard-band operation, since for typical Frequency Division Duplex (FDD) LTE networks synchronization is not a requirement. Thus, UL TDOA may require network synchronization or at least estimated synchronization offsets.

To allow positioning via a single NPRACH attempt, a unique NPRACH preamble may need to be assigned to a UE. This preamble may allow each involved eNB to identify the UE. There may also be a scalability challenge given the limited number of available NPRACH preambles. Accordingly, UL TDOA scalability may be restricted by the number of UL signal sequences and resources. Further, uplink signal assignment coordination may be challenging.

ABBREVIATIONS

Abbreviation Explanation

3GPP 3$^{rd}$ Generation Partnership Project
BS Base Station
CP Cyclic Prefix
CRC Cyclic Redundancy Check
CRS Cell Specific Reference Signal
CSI Channel State Information
CSS Common Search Space
DL Downlink
eMTC Enhanced Machine Type Communications
eNB Evolved Node B (i.e., base station)
eNodeB Evolved Node B (i.e., base station)
EPA Extended Pedestrian A
E-SMLC Evolved Serving Mobile Location Centre
E-UTRA Evolved Universal Terrestrial Radio Access
E-UTRAN Evolved Universal Terrestrial Radio Access Network
DFT Discrete Fourier Transform
FDD Frequency Division Duplex
GNSS Global Navigation Satellite System
IFFT Inverse Fast Fourier Transform
ID Identity
IoT Internet of Things
LMU Location Measurement Unit
LPP LTE Positioning Protocol
LPPa LTE Positioning Protocol Annex
LTE Long Term Evolution
MIMO Multiple Input Multiple Output
MSR Multi-Standard Radio
MTC Machine-Type Communication
NB Narrow-Band
NB-IoT Narrow-Band Internet of Things
NB-LTE Narrow-Band LTE (e.g., 180 KHz bandwidth)
NB-PBCH NB-IoT Physical Broadcast Channel
NB-PSS NB-IoT Primary Synchronization Sequence
NB-SSS NB-IoT Secondary Synchronization Sequence
NPRACH Narrow-band Internet of Things Physical Random Access Channel
OFDM Orthogonal Frequency Division Modulation
OFDMA Orthogonal Frequency Division Modulation Access
OTDOA Observed Time Difference Of Arrival
PA Power Amplifier
PAPR Peak-to-Average Power Ratio
PBCH Physical Broadcast Channel
PDCCH Physical Data Control Channel
PRACH Physical Random Access Channel
PRB Physical Resource Block
PSD Power Spectral Density
PSS Primary Synchronization Sequence
PUSCH Physical Uplink Shared Channel
RACH Random Access Channel
RAT Radio Access Technology
RF Radio Frequency
RRC Radio Resource Control
SC-FDMA Single-Carrier, Frequency Division Multiple Access
SFBC Space Frequency Block Coding
SIB System Information Block
SIM Subscriber Identity Module or Subscriber Identification Module
SNR Signal to Noise Ratio
SoC System-on-a-Chip
SRS Sounding Reference Signal
SSS Secondary Synchronization Sequence
TDD Time Division Duplex
TDOA Time Difference Of Arrival
TOA Time Of Arrival
TU Typical Urban
Tx Transmitter
UE User Equipment
UL Uplink
USS UE-specific Search Space
UTDOA Uplink Time Difference Of Arrival
WB-LTE Wideband LTE (i.e., corresponds to legacy LTE)
ZC Zadoff-Chu algorithm The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, performed by a network node, for determining a position of a wireless device in a wireless communication system, the method comprising:
    determining a set of one or more radio resources on which positioning measurements are to be performed by a group of cells on a device-unique reference signal transmitted by the wireless device; and
    assigning the set or individual radio resources in the set to the group of cells;
    wherein the wireless device is configured to transmit the reference signal using the set of one or more radio resources at a first time; and
    wherein the set of one or more radio resources is also assigned to a second group of cells, with the wireless device configured to transmit the reference signal using the same set of one or more radio resources at a second time.

2. The method of claim 1, further comprising receiving the position measurements from the group of cells.

3. The method of claim 1, further comprising determining the position of the wireless device based on the position measurements from the group of cells.

4. The method of claim 1, further comprising transmitting, to one or more network nodes associated with the group of cells, an indication of the set or the individual radio resources in the set.

5. The method of claim 1, further comprising:
    determining a configuration of the reference signal to be transmitted by the wireless device; and
    transmitting, to the wireless device via a serving network node, an indication of the configuration of the reference signal.

6. The method of claim 1, wherein at least one network node is common between the first and second groups.

7. The method of claim 1, wherein the network node is a location server.

8. The method of claim 1, wherein the network node is a base station.

9. The method of claim 1, further comprising determining which of a plurality of cells form the group of cells.

10. The method of claim 1, further comprising determining which of a plurality of cell groups are associated with the wireless device.

11. A network node for determining a position of a wireless device in a wireless communication system, the network node comprising:
    processing circuitry;
    memory containing instructions executable by the processing circuitry whereby the network node is operative to:
        determine a set of one or more radio resources on which positioning measurements are to be performed by a group of cells on a device-unique reference signal transmitted by the wireless device; and
        assign the set or individual radio resources in the set to the group of cells;
    wherein the wireless device is configured to transmit the reference signal using the set of one or more radio resources at a first time; and
    wherein the set of one or more radio resources is also assigned to a second group of cells, with the wireless device configured to transmit the reference signal using the same set of one or more radio resources at a second time.

12. A method, performed by a network node, for determining a position of a wireless device in a wireless communication system, the method comprising:
obtaining a set of one or more radio resources or individual resources in the set on which positioning measurements are to be performed by a group of cells on a device-unique reference signal transmitted by the wireless device; and
assigning the set or individual radio resources in the set to the wireless device;
wherein the wireless device is configured to transmit the reference signal using the set of one or more radio resources at a first time; and
wherein the set of one or more radio resources is also assigned to a second group of cells, with the wireless device configured to transmit the reference signal using the same set of one or more radio resources at a second time.

13. The method of claim 12, further comprising receiving, from a cell of the network node, the device-unique reference signal transmitted by the wireless device.

14. The method of claim 12, further comprising determining a position measurement of the wireless device based on the received reference signal.

15. The method of claim 12, further comprising receiving, from another network node, an indication of the set of one or more radio resources or the individual resources in the set.

16. The method of claim 12, further comprising transmitting, to the wireless device, an indication of the set of one or more radio resources or the individual resources in the set.

17. The method of claim 12, further comprising:
receiving, from another network node, a configuration of the reference signal to be transmitted by the wireless device; and
sending, to the wireless device, the configuration of the reference signal to be transmitted by the wireless device.

18. The method of claim 17, further comprising determining a configuration of the reference signal unique to the wireless device based on the configuration of the reference signal.

19. The method of claim 12, wherein at least one network node is common between the first and second groups.

20. The method of claim 12, wherein the network node is a base station.

21. The method of claim 12, wherein at least one of the cells of the group of cells is associated with the network node.

22. The method of claim 12, wherein at least one of the cells of the group of cells is associated with a different network node.

23. The method of claim 12, further comprising determining which of a plurality of cells form the group of cells.

24. The method of claim 12, further comprising determining which of a plurality of cell groups are associated with the wireless device.

25. A network node for determining a position of a wireless device in a wireless communication system, the network node comprising:
processing circuitry;
memory containing instructions executable by the processing circuitry whereby the network node is operative to:
obtain a set of one or more radio resources or individual resources in the set on which positioning measurements are to be performed by a group of cells on a device-unique reference signal transmitted by the wireless device; and
assign the set or individual radio resources in the set to the wireless device;
wherein the wireless device is configured to transmit the reference signal using the set of one or more radio resources at a first time; and
wherein the set of one or more radio resources is also assigned to a second group of cells, with the wireless device configured to transmit the reference signal using the same set of one or more radio resources at a second time.

26. A method, performed by a wireless device, for determining a position of the wireless device in a wireless communication system, the method comprising:
obtaining a set of one or more radio resources or individual resources in the set on which positioning measurements are to be performed by a group of cells on a device-unique reference signal transmitted by the wireless device; and
transmitting the reference signal on the set of one or more radio resources or the individual resources in the set, the transmitting comprising:
transmitting the reference signal using the set of one or more radio resources at a first time; and
transmitting the reference signal using the set of one or more radio resources at a second time, wherein the set of one or more radio resources is also assigned to the second group of cells.

27. The method of claim 26, further comprising receiving, from a network node, the set of one or more radio resources or the individual resources in the set.

28. The method of claim 26, further comprising:
receiving, from a network node, an indication of a configuration of the reference signal to be transmitted by the wireless device; and
configuring the reference signal based on the configuration.

29. The method of claim 26, wherein the transmitting includes transmitting the reference signal on the set of one or more radio resources to the group of cells.

30. The method of claim 26, wherein the transmitting includes transmitting the reference signal to each of the group of cells that corresponds to the individual resources in the set of one or more radio resources.

31. The method of claim 26, wherein at least one network node is common between the first and second groups.

32. The method of claim 26, wherein the wireless device is a user equipment.

33. A wireless device for determining a position of the wireless device in a wireless communication system, the wireless device comprising:
processing circuitry;
memory containing instructions executable by the processing circuitry whereby the wireless device is operative to:
obtain a set of one or more radio resources or individual resources in the set on which positioning measurements are to be performed by a group of cells on a device-unique reference signal transmitted by the wireless device; and
transmit the reference signal on the set of one or more radio resources or the individual resources in the set, wherein to transmit the wireless device is further operative to:

transmit the reference signal using the set of one or more radio resources at a first time; and transmit the reference signal using the set of one or more radio resources at a second time, wherein the set of one or more radio resources is also assigned to the second group of cells.

\* \* \* \* \*